United States Patent
Higo

(10) Patent No.: US 11,260,534 B2
(45) Date of Patent: Mar. 1, 2022

(54) INFORMATION PROCESSING APPARATUS AND INFORMATION PROCESSING METHOD

(71) Applicant: CANON KABUSHIKI KAISHA, Tokyo (JP)

(72) Inventor: Tomoaki Higo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 16/364,767

(22) Filed: Mar. 26, 2019

(65) Prior Publication Data

US 2019/0308325 A1 Oct. 10, 2019

(30) Foreign Application Priority Data

Apr. 4, 2018 (JP) ............................. JP2018-072601

(51) Int. Cl.
| | |
|---|---|
| G06K 9/00 | (2006.01) |
| B25J 9/16 | (2006.01) |
| G06T 7/49 | (2017.01) |
| G06T 7/00 | (2017.01) |
| B25J 15/06 | (2006.01) |
| G06T 7/70 | (2017.01) |

(52) U.S. Cl.
CPC ......... *B25J 9/1697* (2013.01); *B25J 15/0616* (2013.01); *G06T 7/0004* (2013.01); *G06T 7/49* (2017.01); *G06T 7/70* (2017.01); *G06T 2207/20081* (2013.01)

(58) Field of Classification Search
CPC ................. B25J 15/0616; B25J 9/1697; G06T 2207/20081; G06T 7/0004; G06T 7/49; G06T 7/70; G06T 2207/20084; B65B 57/12; B65B 59/001; B65B 59/02; G05B 2219/39557

See application file for complete search history.

(56) References Cited

U.S. PATENT DOCUMENTS

| | | | |
|---|---|---|---|
| 2007/0200377 A1* | 8/2007 | Nishio | ................. B25J 15/0616 |
| | | | 294/188 |
| 2017/0136632 A1 | 5/2017 | Wagner | |
| 2019/0084012 A1* | 3/2019 | McCoy, Jr | ........... B25J 15/0616 |
| 2019/0291282 A1* | 9/2019 | Marchese | .............. B25J 9/1661 |

FOREIGN PATENT DOCUMENTS

| | | |
|---|---|---|
| JP | H10-161730 A | 6/1998 |
| JP | 2006-047098 A | 2/2006 |
| JP | 2014-050936 A | 3/2014 |
| JP | 2014-213395 A | 11/2014 |
| JP | 2016-023079 A | 2/2016 |
| JP | 2017-064910 A | 4/2017 |

\* cited by examiner

*Primary Examiner* — Tom Y Lu
(74) *Attorney, Agent, or Firm* — Canon U.S.A., Inc. IP Division

(57) ABSTRACT

An information processing apparatus for determining an area of a packaged object in a packaging material to suctioned by a suction device for picking up the packaged object includes an input unit configured to input an image obtained by capturing the packaged object, and a determining unit configured to, based on a state of a surface of the packaging material regarding a degree of ease of suction in each area of the surface of the packaging material identified based on the image, determine the area to be suctioned by the suction device.

18 Claims, 14 Drawing Sheets

INFORMATION PROCESSING APPARATUS AND INFORMATION PROCESSING METHOD

BACKGROUND

Field

The present disclosure relates to a technique for suctioning an object using a robot.

Description of the Related Art

In a case where an object is picked and placed using an industrial robot, a robot arm having a suction pad attached to the end thereof is used to convey the object while suctioning the object. When the object is suctioned, it is necessary to place the suction pad, on an area that is easy to suction, on the surface of the object. In a case where the object is bagged in a packaging material, it is necessary to suction the object in the bagged state.

Japanese Patent Application Laid-Open No. 2014-213395 discusses a technique for suctioning a bagged object by suctioning the bagged object with a suction surface covering the entirety of the bagged object.

An area that is easy to suction widely varies depending on the state of the surface of the packaging material. Thus, even if a suction pad is haphazardly pressed against some part of a packaged object, it is difficult to appropriately suction the packaged object. In Japanese Patent Application Laid-Open No. 2014-213395, in a case where many wrinkles or holes are present on the surface of a bag as a packaging material, air enters between the packaging material and the suction surface. Thus, it is not possible to stably suction the packaging material.

SUMMARY

The present disclosure is directed to stably suctioning a packaged object obtained by packaging an object in a packaging material.

An information processing apparatus for determining an area of a packaged object in a packaging material to be suctioned by a suction device for picking up the packaged object includes an input unit configured to input an image obtained by capturing the packaged object, and a determining unit configured to, based on a state of a surface of the packaging material regarding a degree of ease of suction in each area of the surface of the packaging material identified based on the image, determine the area to be suctioned by the suction device.

Further features of the present disclosure will become apparent from the following description of exemplary embodiments with reference to the attached drawings.

DESCRIPTION OF THE EMBODIMENTS

Figure 1:
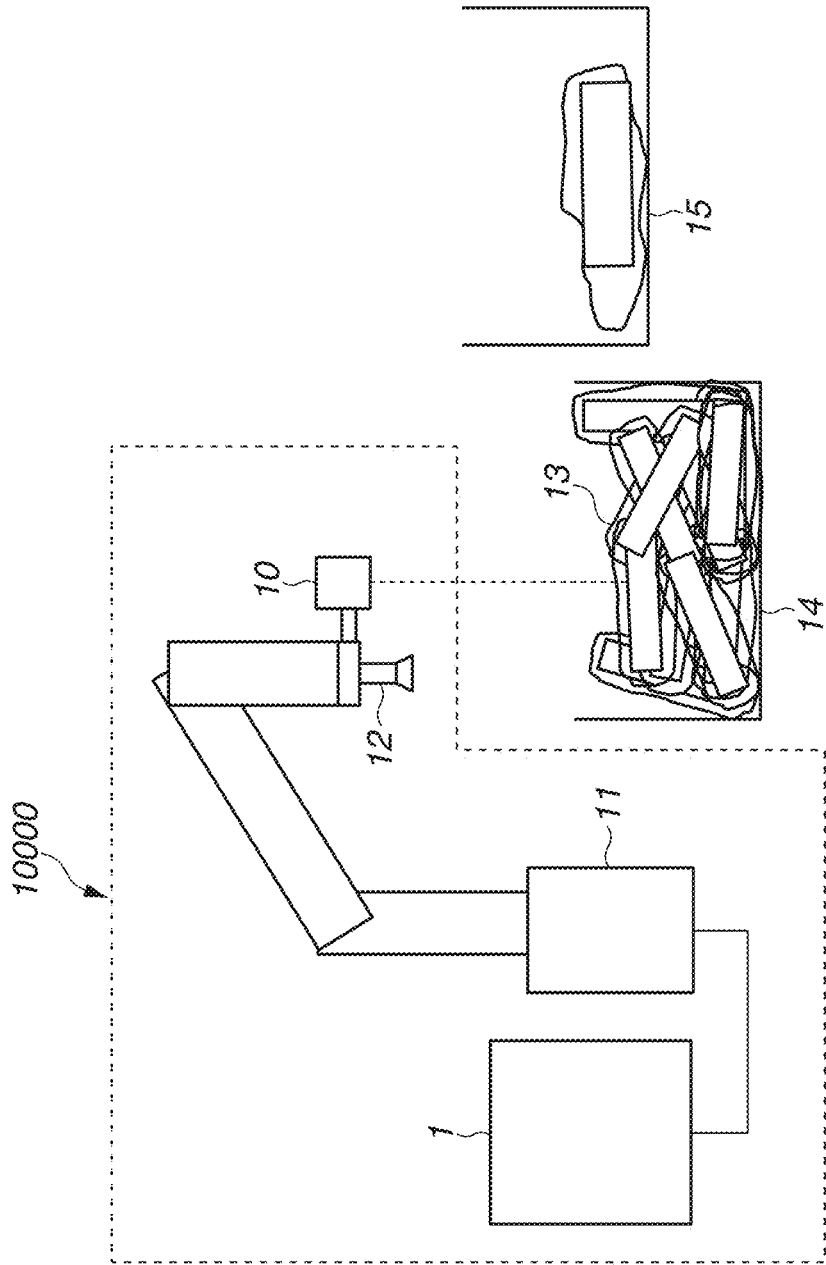
FIG. 1 is a diagram illustrating an example of a configuration of an information processing system.

Before providing a description of exemplary embodiments, the definitions of terms are described.

A packaging material refers to vinyl, nylon, paper, or cloth. A packaged object is obtained by packaging an object in the packaging material. The packaged object is, for example, a cable in a plastic bag, a packet of potato chips, or a wrapped suitcase.

Packaging material information refers to information regarding the packaging material and is composed of features including a material feature and a structural feature. The state of the surface of the packaging material can be found based on the packaging material information. The material name, the thickness, the softness, or the transparency of the packaging material is referred to as the "material feature". A wrinkle or a hole on the packaging material, or unevenness on the surface of the packaging material is referred to as the "structural feature". As a consequence of the fact that the material feature is found, for example, then in a case where the material of the packaging material is nylon, the state where wrinkles on the surface of the packaging material are white and linear appears as an image feature. A map obtained by converting the two features (the packaging material information) into numerical values and arranging the numerical values in a two-dimensional array in association with each area of an image is referred to as a "packaging material map". The packaging material map will be described with reference to FIG. 14.

The packaging material map is a map obtained by, to associate a captured scene with the packaging material information, reflecting the packaging material information on an image obtained by capturing the scene, so that each type of packaging material can be distinguished. That is, the packaging material map is an image obtained by adding information about the state of the surface of the packaging material to a packaging material area of a captured image.

The packaging material map is obtained using a packaging material information database. The packaging material information database is data (first information) indicating the relationship between an image feature and the state of the surface with respect to each area. In the packaging material information database, a plurality of patches (partial images indicating the state of the surface of the packaging material) is registered with respect to each material feature and each structural feature of the packaging material. Further, patches having a similar degree of ease of suction are classified into the same classification. These patches are collated with an image as a recognition target. That is, the feature of a partial image of the packaging material is detected from the image with respect to each area of the image, thereby obtaining information about the state of the surface of the packaged object. The areas are classified into an area where the packaging material is present and an area where the packaging material is not present. Further, to the area where the packaging material is present, information regarding the state of the surface of the packaging material (e.g., a state where a wrinkle or a hole is present, or the surface is smooth) is assigned. For example, in FIG. 14, an image 140 is an image obtained by capturing packaged objects loaded in bulk in a container. A thick line in the image 140 indicates the frame of the container. In the captured image 140 obtained by capturing a scene including these packaged objects, each area obtained by scanning the captured image 140 with a sliding window such as a frame 1400 is subjected to a matching process with the patches in the packaging material information database. The size of the sliding window may be any size. The size of the window may be set according to, for example, the size of a suction pad or the size of each patch in the packaging material information database. Areas of the image that match the packaging material information are as illustrated in a packaging material map 141 associated with the packaging material information. In the packaging material map 141, an area 1411 is an area that matches a patch including few wrinkles and overlaps. An area 1412 is an area that matches a patch including many overlaps between objects. An area 1413 indicates an area that matches a patch including a hole or a wrinkle. The other areas are areas that do not match any of the patches in the packaging material information database. In this case, an example has been illustrated where a matching process with three types of patches is performed. Alternatively, another method may be employed.

Suction property information is data (second information) indicating information regarding suction with respect to the state of the surface of the packaging material. The information regarding suction is the degree of ease of suction. The information regarding suction is information obtained by converting the degree of ease of suction (the likelihood of suction) onto the structural feature and the material feature of the packaging material into numerical values and associating the numerical values with each other. The information regarding suction is table information for returning a numerical value indicating that the likelihood of suction is high or low to each area (a pixel or a row of pixels) of the packaging material map. The information regarding suction may include information obtained by associating the degree of ease of suction with the feature of the surface of an object other than the packaging material.

Figure 14:
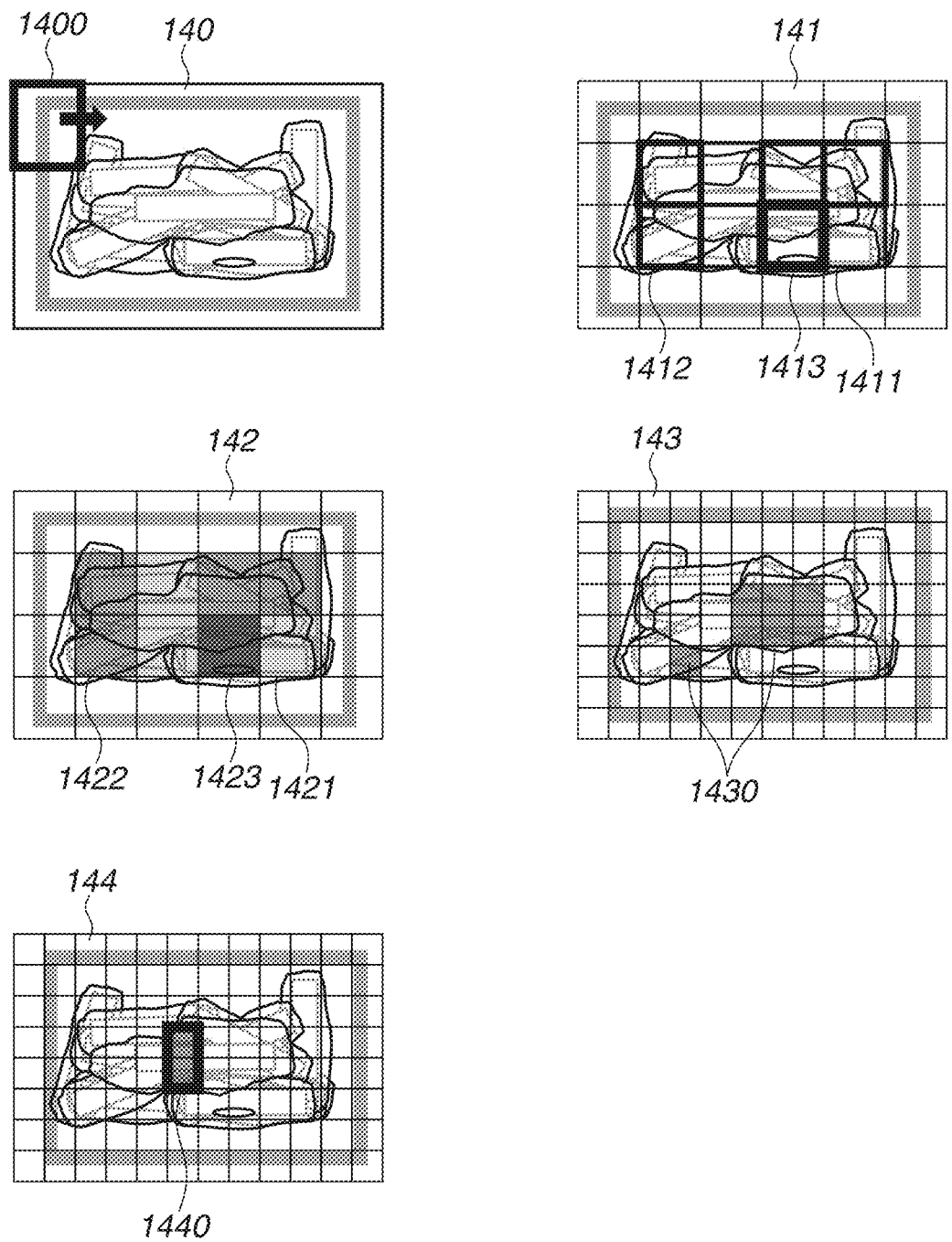
FIG. 14 is a diagram illustrating examples of a packaging material map, a suction likelihood map, and a suction target map.

A suction likelihood map is a map obtained by associating the suction property information with the packaging material map and reflecting the association on the image obtained by capturing the scene. The suction likelihood map indicates that the higher the numerical value of the area, the easier to suction the area is based on the viewpoint of the packaging material information. That is, the suction likelihood map is a map obtained by arranging the degree of ease of suction (the likelihood of suction) with respect to the structural feature and the material feature of the packaging material in a two-dimensional array in association with each area of the image. In the suction likelihood map, for example, with respect to each area extracted from the packaging material map, the easier to suction the area, the larger the numerical value assigned to the area. In this case, in a suction likelihood map 142, an area that is easy to suction is represented by a dark color, and an area that is difficult to suction is represented by a light color. For example, in the suction likelihood map 142 in FIG. 14, areas 1422 and 1423 each include an overlap, a hole, or a wrinkle and therefore correspond to suction property information indicating that the area is difficult to suction (e.g., a numerical value close to 0). An area 1421 is an area including few wrinkles and holes and therefore corresponds to suction property information indicating that the area is easy to suction (e.g., a numerical value close to 1). The areas 1421, 1422, and 1423 correspond to the areas 1411, 1412, and 1413, respectively, in the packaging material map 141.

A suction candidate area is an area as a candidate to be suctioned that is determined based on the geometrical placement of a conveyance target object (a packaged object). For example, in a case where a plurality of conveyance target objects is piled, the suction candidate area is an area of the upper surface of an conveyance target object that is easy to take out, and is also an area near the center of gravity of the conveyance target object, where the conveyance target object is easy to convey by suctioning the conveyance target object. In the present exemplary embodiment, the position and the orientation of the packaged object are obtained using image recognition. A specific method will be described below. For example, an image 143 in FIG. 14 indicates a distance image of the scene captured to obtain the image 140. From the distance image, three-dimensional position/orientation information regarding the packaging material is obtained. Among a plurality of packaged objects, a packaged object having the smallest value indicating the depth from an image capturing unit 10 is determined as a suction target. A colored area 1430 is an area suitable for suctioning an object located on the near side as viewed from a camera. In this case, the area 1430 as a suction candidate area may be acquired at a different resolution from or the same resolution as that of the packaging material map or the suction likelihood map.

A suction target map is a map obtained by, to suction the conveyance target object (the packaged object), mapping an area suitable for suction based on both the suction likelihood map and the suction candidate area. The suction target map indicates that the higher the numerical value of the area, the more suitable for suction the area is. That is, the suction target map is a map obtained by arranging binary information that indicates 1 if the area can be suctioned or 0 if the area cannot be suctioned, in a two-dimensional array in association with each area of the image. The suction target map may hold, instead of the binary information, a value from 0 to 1 indicating the possibility of suction. A suction target map 144 in FIG. 14 is generated based on the suction likelihood map 142 and the distance image 143. An area that has a great degree of ease of suction in the suction likelihood map 142 and can be suctioned in the distance image 143 is a suctionable area (i.e., an area that can be suctioned). An area 1440 indicates the suctionable area. Thus, a numerical value of 1 indicating that the area can be suctioned is assigned to the area 1440. To other areas, a numerical value of 0 indicating that the area cannot be suctioned is assigned. Alternatively, the area 1440 may have a numerical value of 1, a colorless area may have a numerical value of 0, and an area having an intermediate color may have a numerical value from 0 to 1. For example, two maps may be combined together, thereby scoring the degree of ease of suction with respect to each area and determining an area having the highest score as a suction area.

An information processing apparatus according to a first exemplary embodiment performs the task of taking each of packaged objects piled in a container out of the container by suctioning the packaged object, conveying the packaged object to a predetermined position, and placing the packaged object at the predetermined position. To suction the packaged object, it is necessary to create a vacuum state between a packaging material and a suction pad. To this end, to prevent air from entering (vacuum from leaking from) the space between the packaging material and the suction pad, it is necessary to suction the conveyance target by bringing the suction pad into close contact with the conveyance target. For example, even if the packaged object is suctioned by pressing the suction pad against an area where vinyl as the packaging material of the packaged object has a wrinkle, vacuum leaks from the area where the vinyl has the wrinkle. Thus, the packaged object cannot be suctioned. Thus, in the present exemplary embodiment, from an image obtained by capturing a packaged object, an area suitable for suction is detected based on information regarding a packaging material, thereby stably suctioning the packaged object. In the present exemplary embodiment, an execution mode and a learning mode are separately described. First, a description is given of the processing of the execution mode for determining a suction position and performing a pick-and-place task. The pick-and-place task refers to the task of taking each of the packaged objects piled in a container out of the container by suctioning the packaged object, then conveying the packaged object to a predetermined position, and placing the packaged object at the predetermined position. FIG. 1 is a diagram illustrating the configuration of an information processing system 10000 according to the present exemplary embodiment. The information processing system 10000 includes an information processing apparatus 1, an image capturing unit 10, an actuator unit 11, and a suction unit 12. Based on captured image information regarding an image captured by the image capturing unit 10 attached to the actuator unit 11, the information processing system 10000 controls the actuator unit 11, which is a robot arm. Then, the information processing system 10000 performs the task of carrying each of packaged objects 13 in a container 14 to a conveyance destination 15 by suctioning the packaged object 13 using the suction unit 12 attached to the end of the actuator unit 11.

<Configuration of Information Processing Apparatus (Execution Mode)>

Figure 2:
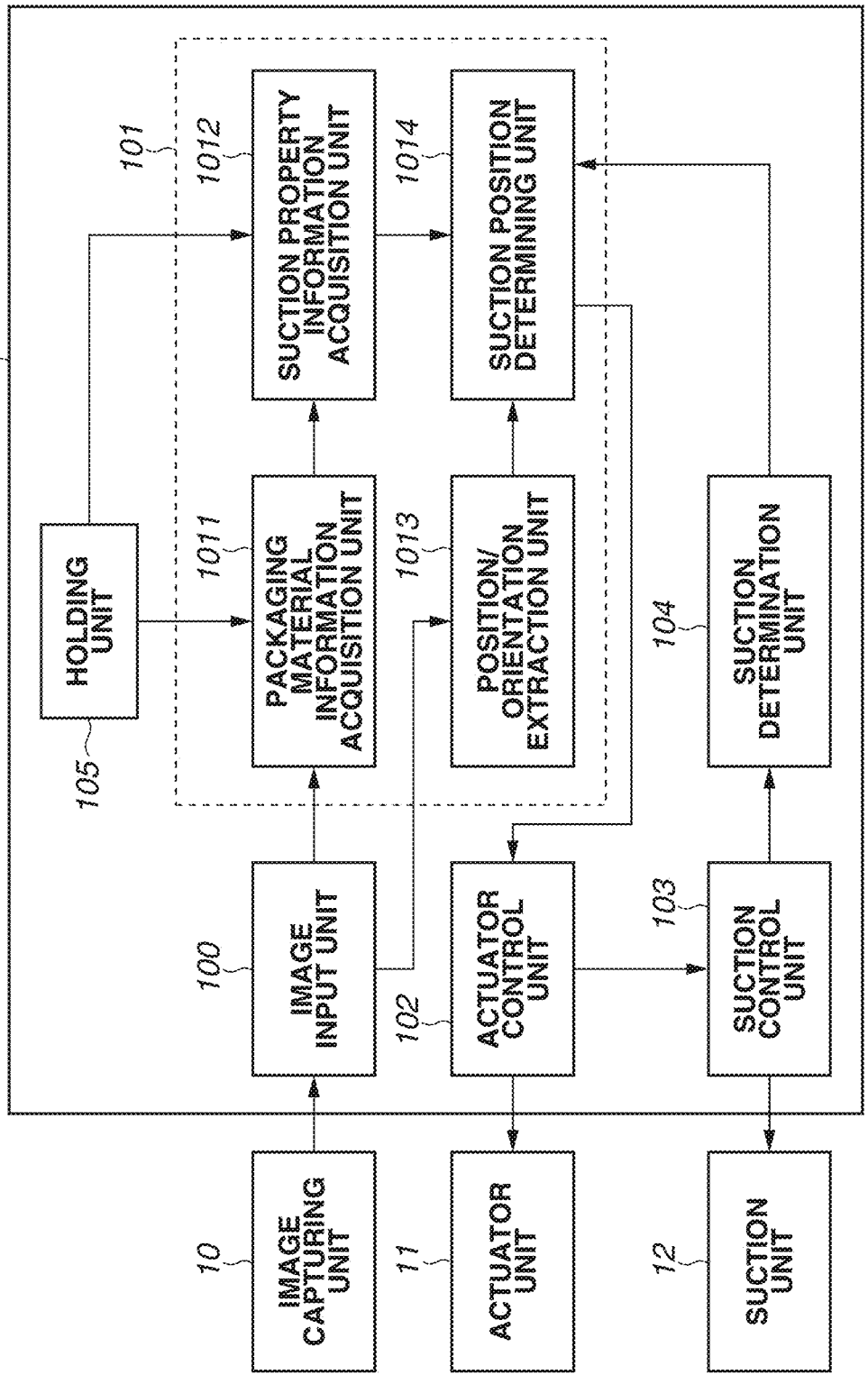
FIG. 2 is a diagram illustrating an example of a functional configuration of an information processing apparatus.

FIG. 2 is a diagram illustrating an example of the functional configuration of the information processing apparatus 1 according to the present exemplary embodiment. The information processing apparatus 1 includes an image input unit 100, a determining unit 101, an actuator control unit 102, a suction control unit 103, a suction determination unit 104, and a holding unit 105. The image input unit 100 is connected to the image capturing unit 10. The actuator control unit 102 is connected to the actuator unit 11. The suction control unit 103 is connected to the suction unit 12. FIG. 2, however, is an example of the device configuration, and does not limit the applicable scope of the present invention. The holding unit 105 may be provided outside the information processing apparatus 1.

The image capturing unit 10 captures a color image and a distance image of a scene. As the image capturing unit 10, for example, a stereo camera, a red, green, and blue-depth (RGB-D) camera, or a dual pixel autofocus (DAF) camera is used. In the present exemplary embodiment, for example, the image capturing unit 10 captures a scene including the packaged objects 13 and the container 14 and outputs a color image and a distance image.

The color image and the distance image of the scene captured by the image capturing unit 10 are input to the image input unit 100, and the image input unit 100 outputs the color image and the distance image to the determining unit 101.

The holding unit 105 holds a packaging material information database and inputs the packaging material information database to a packaging material information acquisition unit 1011. Further, the holding unit 105 holds suction property information and inputs the suction property information to a suction property information acquisition unit 1012.

The determining unit 101 determines, from the images input from the image input unit 100, a position to be suctioned by the suction unit 12. The determining unit 101 includes the packaging material information acquisition unit 1011, the suction property information acquisition unit 1012, a position/orientation extraction unit 1013, and a suction position determining unit 1014. The determining unit 101 outputs the position to be suctioned to the actuator control unit 102.

Based on the packaging material information database held in the holding unit 105 and the color image or the distance image input from the image input unit 100, the packaging material information acquisition unit 1011 acquires information (a packaging material map) regarding the packaging materials of the packaged objects 13. That is, the packaging material information acquisition unit 1011 acquires from the image the states of the surfaces of the packaging materials with respect to each area. A specific method will be described below.

The suction property information acquisition unit 1012 acquires the suction property information held in the holding unit 105. Then, based on the color image or the distance image input from the image input unit 100, the packaging material map, and the suction property information, the suction property information acquisition unit 1012 obtains a suction likelihood map (an area suitable for suction). In this case, by referencing the suction property information, the suction property information acquisition unit 1012 obtains the degree of ease of suction with respect to the states of the surfaces of the packaging materials obtained by the packaging material information acquisition unit 1011. A specific method will be described below.

Based on the color image or the distance image, the position/orientation extraction unit 1013 extracts the positions and the orientations of the packaged objects 13. In this case, the position/orientation extraction unit 1013 extracts the positions of, among the piled packaged objects 13, packaged objects 13 that are not blocked by another packaged object 13. A specific method will be described below.

Based on the suction likelihood map and the positions and the orientations of the packaged objects 13 obtained by the position/orientation extraction unit 1013, the suction position determining unit 1014 obtains a suction target map. Then, the suction position determining unit 1014 determines, as a suction position (a position to be suctioned), a position having the highest likelihood of suction in the suction target map and outputs the suction position to the actuator control unit 102. Further, based on a suction determination result input from the suction determination unit 104, the suction position determining unit 1014 updates the suction target map.

Based on the suction position input from the suction position determining unit 1014, the actuator control unit 102 controls the actuator unit 11 to convey one of the packaged objects 13 by suctioning the packaged object 13. Further, when the packaged object 13 is suctioned, the actuator control unit 102 cooperates with the suction control unit 103 to control the timing of the suction.

To suction the packaged object 13, the suction control unit 103 cooperates with the actuator control unit 102 to control the suction of the suction unit 12. Further, the suction control unit 103 acquires vacuum pressure when the suction is performed to suction the packaged object 13. Then, the suction control unit 103 outputs the acquired vacuum pressure to the suction determination unit 104.

Based on the vacuum pressure input from the suction control unit 103, the suction determination unit 104 determines whether the suction unit 12 is successfully suctioning the packaged object 13. The suction determination unit 104 outputs the suction determination result to the suction position determining unit 1014.

Figure 3:
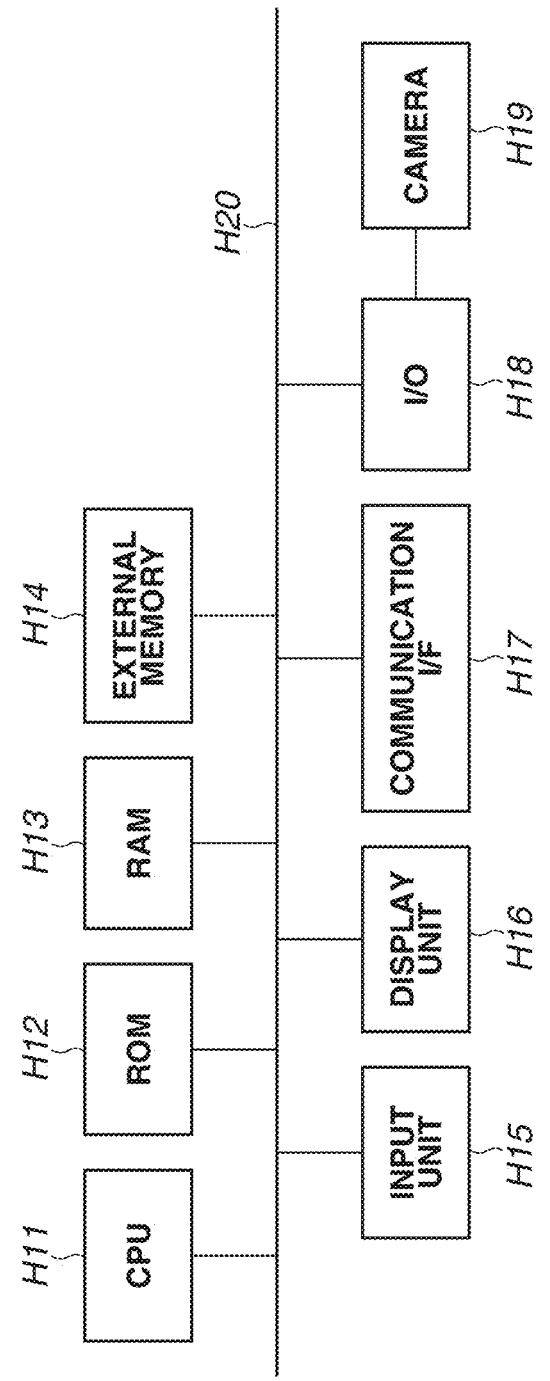
FIG. 3 is a diagram illustrating an example of a hardware configuration of the information processing apparatus.

FIG. 3 is a diagram illustrating the hardware configuration of the information processing apparatus 1. A central processing unit (CPU) H11 controls various devices connected to a system bus H20. A read-only memory (ROM) H12 stores a program for a Basic Input/Output System (BIOS) and a boot program. A random-access memory (RAM) H13 is used as a main storage device for the CPU H11. An external memory H14 stores a program to be processed by the information processing apparatus 1. An input unit H15 is a touch panel, a keyboard, a mouse, and a robot controller and performs processing regarding the input of information. According to an instruction from the CPU H11, a display unit H16 outputs the calculation result of the information processing apparatus 1 to a display device. The display device may be of any type such as a liquid crystal display device, a projector, or a light-emitting diode (LED) indicator. A communication interface H17 communicates information via a network. The communication interface H17 may be an Ethernet (registered trademark) interface and may be of any type such as USB, serial communication, or wireless communication. An input/output unit (I/O) H18 is connected to a camera H19. The camera H19 corresponds to the image capturing unit 10.

In the first exemplary embodiment, the image capturing unit 10 is attached to the actuator unit 11. When a position and an orientation that can be suctioned are determined on an image captured by the image capturing unit 10, then to move the actuator unit 11 to the determined position, the relationship between the coordinate system of the actuator unit 11 and the coordinate system of the image capturing unit 10 is calibrated in advance, thereby obtaining parameters with six degrees of freedom. Similarly, the suction unit 12 is attached to the end of the actuator unit 11. To move the suction unit 12 to a desired position, the relationship between the coordinate systems of the actuator unit 11 and the suction unit 12 is calibrated in advance, thereby obtaining parameters with six degrees of freedom.

<Processing (Execution Mode)>

Figure 4:
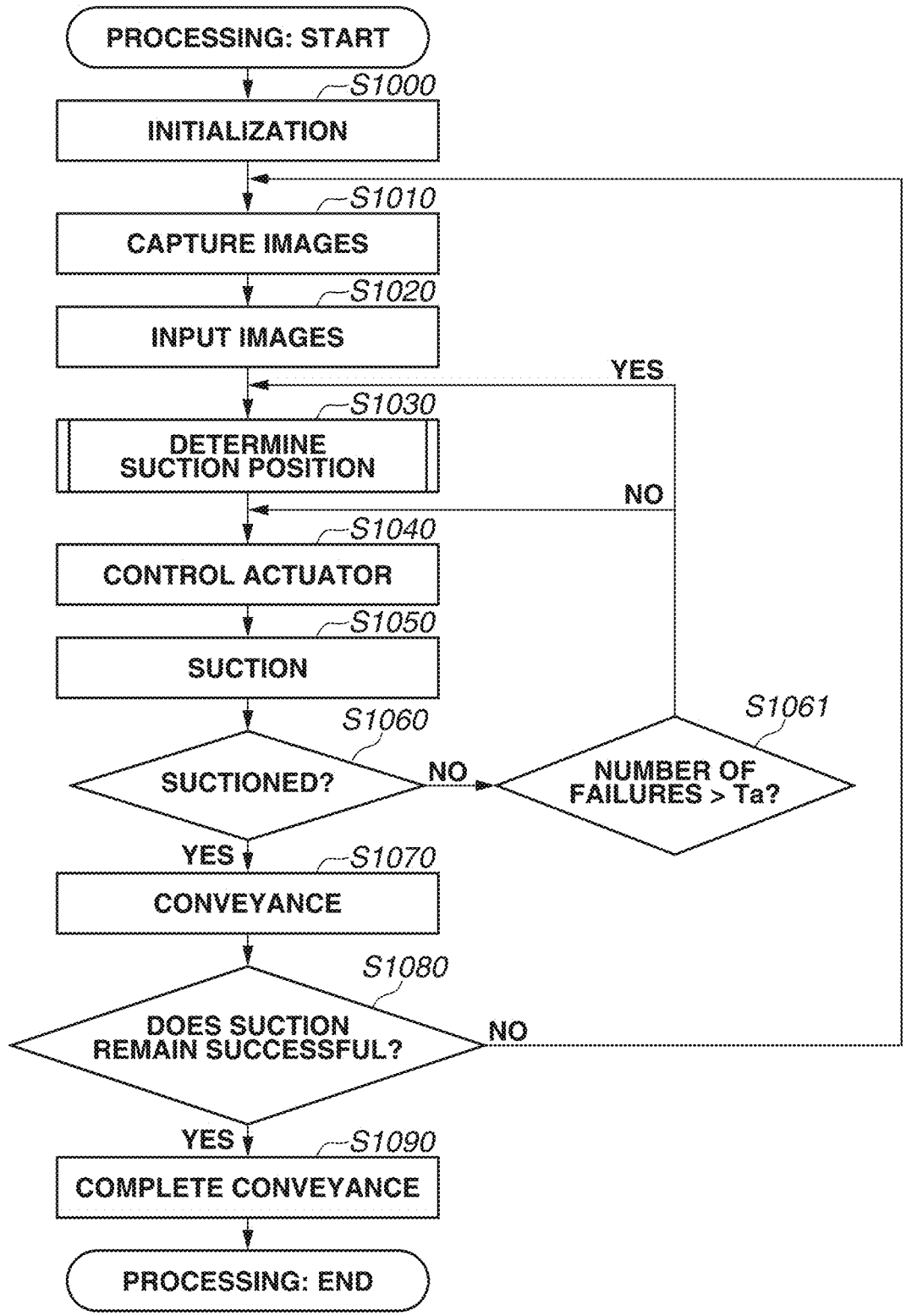
FIG. 4 is a flowchart illustrating a processing procedure performed by the information processing system.

Next, a processing procedure according to the present exemplary embodiment is described. FIG. 4 is a flowchart illustrating a processing procedure performed by the information processing system 10000 including the information processing apparatus 1 according to the present exemplary embodiment.

In step S1000, the system is initialized. That is, a program is read from the external memory H14, thereby enabling the information processing apparatus 1 to operate. Using information calibrated in advance, the image capturing unit 10 and the actuator unit 11 are started, the parameters of the image capturing unit 10 and the actuator unit 11 are read, calibration information regarding the image capturing unit 10, the actuator unit 11, and the suction unit 12 is read, and the internal parameters (the focal length, the image center position, and the lens distortion) of the image capturing unit 10 are read. Further, a packaging material information database and suction property information held in the holding unit 105 are read. Further, the positions of the container 14 and the conveyance destination 15 are read.

In step S1010, the actuator control unit 102 controls the actuator unit 11. The image capturing unit 10 moves to the position where the image capturing unit 10 can capture the packaged objects 13 in the container 14. Then, the image capturing unit 10 captures a color image and a distance image of a scene.

In step S1020, the image input unit 100 acquires the color image and the distance image captured in step S1010 and inputs the color image and the distance image to the determining unit 101. The image input unit 100 may acquire a grayscale image or an infrared image so long as the surfaces of the packaging materials can be observed in the image.

In step S1030, the determining unit 101 determines the suction position of one of the packaged objects 13. With reference to a flowchart in FIG. 13, the processing of the determining unit 101 is described below.

In step S1031, based on the color image, the distance image, and the packaging material information database, the packaging material information acquisition unit 1011 acquires a packaging material map in which either image and packaging material information are associated with each other. The packaging material map is a map in which, as in the packaging material map 141 in FIG. 14, the packaging material information (the presence or absence of a wrinkle and the material of the packaging material) is included in each area of either image input in step S1020. In an area where the packaging material is present, the packaging material information is acquired. In an area where the packaging material is not present, information indicating that the packaging material is not present is acquired. Specifically, with reference to the packaging material information database (not illustrated), a part of the color image is clipped as a patch, and the packaging material information database is searched for a patch having a feature similar to that of the clipped patch, thereby acquiring the packaging material information. Such a process is performed by scanning the color image with the sliding window 1400. Then, the packaging material information is acquired in each area, thereby obtaining the packaging material map. Further, the packaging material information may be acquired using not only the color image but also a monochrome image or the distance image.

In step S1032, the suction property information acquisition unit 1012 acquires from the holding unit 105 the suction property information, which is a correspondence table indicating the correspondence between the packaging material information and a numerical value indicating the degree of ease of suction (the likelihood of suction). For example, each of the areas 1411, 1412, and 1413 in FIG. 14 is associated with the likelihood of suction in advance in the table.

In step S1033, based on the packaging material map obtained in step S1031 and the suction property information acquired in step S1032, the suction property information acquisition unit 1012 converts each area of the packaging material map into the likelihood of suction, thereby acquiring an suction likelihood map (a portion easy to suction). For example, a table (a dictionary for conversion) holds a large amount of case information indicating cases where in the packaging material map, an area (e.g., the area 1411) which is made of vinyl and is smooth and where pixels of a flat surface are arranged has a high value for the likelihood of suction, and an area (e.g., the area 1413) which is made of vinyl, is rough, and has a hole has a low value for the likelihood of suction. The suction property information acquisition unit 1012 searches the table of the suction property information for data similar to the obtained packaging material map and obtains the value of the likelihood of suction corresponding to the data in each area, thereby obtaining the suction likelihood map.

In step S1034, the position/orientation extraction unit 1013 matches a template (an image feature) indicating the feature of a packaged object 13 with either image input from the image input unit 100, thereby detecting the packaged objects 13 and further extracting the positions of the packaged objects 13. Specifically, the position/orientation extraction unit 1013 extracts, from the color image, image features for detecting the packaged objects 13 piled in the container 14 and matches the extracted image features with the template indicating the feature of a packaged object 13, thereby identifying the positions of the packaged objects 13. In this case, the template is obtained by observing a packaged object 13 in various orientations and associating features in images with the orientations of the packaged object 13 included in the images. If the features resemble each other, the template indicates that the packaged object 13 is in similar orientation states. The template held in advance in the holding unit 105 or held in an external storage unit is acquired. The template may be a two-dimensional image or may be a three-dimensional model of the packaged object 13. In this case, the two-dimensional positions of a plurality of packaged objects 13 are acquired.

In step S1035, the position/orientation extraction unit 1013 identifies the positions of packaged objects 13 that do not interfere with another packaged object 13 in the distance image (three-dimensional information). Then, the position/orientation extraction unit 1013 extracts the orientations of the packaged objects 13 three-dimensionally from the distance image. Then, the position/orientation extraction unit 1013 acquires a suction candidate area (an extraction result) of a packaged object 13 in which a surface that can be suctioned is present. The area 1430 included in the distance image 143 in FIG. 14 is an example of the suction candidate area. That is, the suction candidate area is obtained as follows. Areas where the packaged objects 13 are present are collated with the image feature of a packaged object 13, thereby extracting the two-dimensional positions of the packaged objects 13. Then, the three-dimensional positions of a plurality of packaged objects 13 that can be suctioned by the suction unit 12 are further extracted using depth information regarding the distance image. Using the three-dimensional positions of the packaged objects 13, a position to be suctioned can be determined with high accuracy. In the distance image, the positions of, among the piled packaged objects 13, packaged objects 13 that are located on the near side and do not interfere with another packaged object 13 are identified, and the orientations of the packaged objects 13 are obtained three-dimensionally from the distance image. That is, among the plurality of packaged objects 13, packaged objects 13 having the smallest value indicating the depth from the image capturing unit 10 are determined as suction targets. The piled packaged objects 13 are suctioned from one on the top of the pile, so that it is possible to prevent the pile from collapsing. Thus, it is possible to stably suction each of the packaged objects 13. Further, a suction candidate area is obtained by, based on the orientations of the packaged objects 13, limiting the packaged objects 13 to a packaged object 13 in which a surface that can be suctioned is present. In a case where only a single packaged object 13 is present, or the packaged objects 13 are aligned, the orientation of each packaged object 13 may be estimated in step S1035.

In step S1036, in the suction likelihood map obtained in step S1033, the suction position determining unit 1014 performs a mask process on the suction candidate area obtained in step S1035, thereby generating a suction target map (a candidate position where the packaged object 13 is to be suctioned). Then, the suction position determining unit 1014 outputs, as a suction position (a position to be suctioned), a position having the highest likelihood of suction in the suction target map to the actuator control unit 102. That is, using as a mask a two-dimensional image in which the obtained suction candidate area is 1 and other areas are 0, the suction position determining unit 1014 takes the product of a pixel of the mask and a pixel of the suction likelihood map, thereby acquiring the suction target map. Further, with reference to a failure list, the suction position determining unit 1014 reduces the numerical value, in the suction target map, of an area that is difficult to suction on the suction target map, thereby updating the suction target map such that the area is difficult to suction. This can avoid an area of which the suction is failed, and increase the success rate of suction. The positions of a plurality of packaged objects are acquired as candidates, whereby it is possible to efficiently perform a suction task.

Steps S1031 to S1033 and steps S1034 and S1035 may be processed in a different order from the one described above, or may be processed in parallel with another process. In a case where steps S1031 to S1033 are processed before steps S1034 and S1035, this is suitable for the task of picking and placing aligned packaged objects in order. In this case, the packaging material map and the suction likelihood map may only need to be created once. Thus, it is possible to reduce processing load. Further, in a case where steps S1034 and S1035 are processed before steps S1031 to S1033, the processes of steps S1031 to S1033 are performed within areas where extracted packaged objects are present. If only the feature of a packaged object located at the position where the packaged object is the easiest to pick up is processed, the processing range is limited. Thus, it is possible to reduce processing load.

In step S1040, based on the suction position obtained in step S1030, the actuator control unit 102 controls the actuator 11 to bring the suction unit 12 into close contact with the surface of the packaged object 13. Then, the actuator control unit 102 sends a signal to the suction control unit 103 to start suction.

In step S1050, the suction control unit 103 controls the suction unit 12 to start suction, thereby suctioning the packaged object 13.

In step S1060, the suction determination unit 104 determines whether the suction is successful by checking vacuum pressure. If a vacuum pressure gauge indicates sufficiently low pressure in the suction unit 12 relative to atmospheric pressure, the suction is successful. If the suction is successful (YES in S1060), the processing proceeds to step S1070. If the suction is failed (NO in S1060), a position slightly shifted from the original suction position is determined as a new suction position, and the processing returns to step S1040. Even if the suction is failed, it is possible to quickly return. That is, it is possible to efficiently perform the task. Further, the position slightly shifted from the original suction position is varied every time suction is failed. At this time, if the suction position is shifted in the direction in which the probability of suction is higher in the suction target map, the possibility that suction will be successful is higher. Further, if the suction is failed, and the suction determination unit 104 determines that the number of times the processing returns to step S1040 exceeds a predetermined number of failures Ta, the suction determination unit 104 registers in a failure list an area where the failure of suction is repeated, and the processing returns to step S1030. As the number of failures Ta, the number of times is specified in advance by a user. The failure list is a list including [x1, y1), (x2, y2), . . . ] indicating the suction position on an image, or [(x1, y1, z1), (x2, y2, z2), . . . ] indicating the suction position in a three-dimensional coordinate system. The failure list is held in the holding unit 105 or a storage unit accessible by the determining unit 101. When the suction position determining unit 1014 determines the next suction position, the suction position determining unit 1014 determines the suction position by excluding the positions included in the failure list. If the processing returns to step S1030, the suction target map is updated with reference to the failure list, whereby suction is performed using not the original suction position but the second suction position as the suction position. Further, information registered once in the failure list may be excluded from the failure list in a case where a series of operations of the task of conveying each of the packaged objects 13 by suctioning the packaged object 13 is repeated a predetermined number of times, or in a case where a change in the state of surroundings adjacent to an area where suction is failed (e.g., the interference between packaged objects 13) is detected.

In step S1070, the actuator control unit 102 controls the actuator unit 11 to convey the packaged object 13 to the conveyance destination 15. Further, step S1080 is a process performed simultaneously in parallel while step S1070 is executed, i.e., while the packaged object 13 is conveyed from the container 14 to the conveyance destination 15.

In step S1080, the suction determination unit 104 confirms whether the suction on the packaged object 13 remains successful (the packaged object 13 is not dropped) by checking vacuum pressure during the conveyance. If the packaged object 13 reaches the conveyance destination 15 in the state where the suction on the packaged object 13 remains successful (YES in step S1080), the processing proceeds to step S1090. If the suction on the packaged object 13 is failed, and the packaged object 13 is dropped before the packaged object 13 reaches the conveyance destination 15 (NO in step S1080), the processing returns to step S1010. In step S1010, to suction and convey a new packaged object 13, images of the packaged objects 13 in the container 14 are captured again.

In step S1090, the suction control unit 103 controls the suction unit 12 to break vacuum, thereby placing the packaged object 13 at the conveyance destination 15. Further, in a case where a plurality of packaged objects 13 piled in the container 14 need to be picked and placed at the conveyance destination 15 by the task, the processing may return from step S1090 to step S1010 and continue.

By the above processing, it is possible to pick each of the packaged objects 13 from the container 14 and place the packaged object 13 at the conveyance destination 15.

As described above, in the first exemplary embodiment, the likelihood of suction is calculated based on packaging material information regarding a packaging material in a scene, thereby generating an suction likelihood map indicating an area that is easy to suction from the viewpoint of the packaging material information. Further, packaged objects 13 are detected in a color image or a distance image, and then a suction candidate area is obtained based on the positions of the piled packaged objects 13. Then, the suction candidate area is combined with the suction likelihood map, thereby generating a suction target map. Then, an optimal position for suction is obtained and suction is performed using the obtained position. This achieves a pick-and-place task by stable suction. Thus, it is possible to stably suction an object packaged in a packaging material.

(Learning Mode)

In the execution mode, a case has been described where information and a database necessary to perform the task of taking each of packaged objects piled in a container out of the container by suctioning the packaged object, then conveying the packaged object to a predetermined position, and placing the packaged object at the predetermined position are held in advance. In contrast, in the learning mode, a case is described where the suction property information held in the holding unit is attained by learning. An information processing system in the learning mode includes a mode switching unit (not illustrated) and can switch the execution mode for performing the task and the learning mode for performing learning. The learning mode is described. The configuration of the information processing system in the learning mode is similar to that in the execution mode illustrated in FIG. 1 and therefore is omitted.

<Configuration of Information Processing Apparatus (Learning Mode)>

Figure 5:
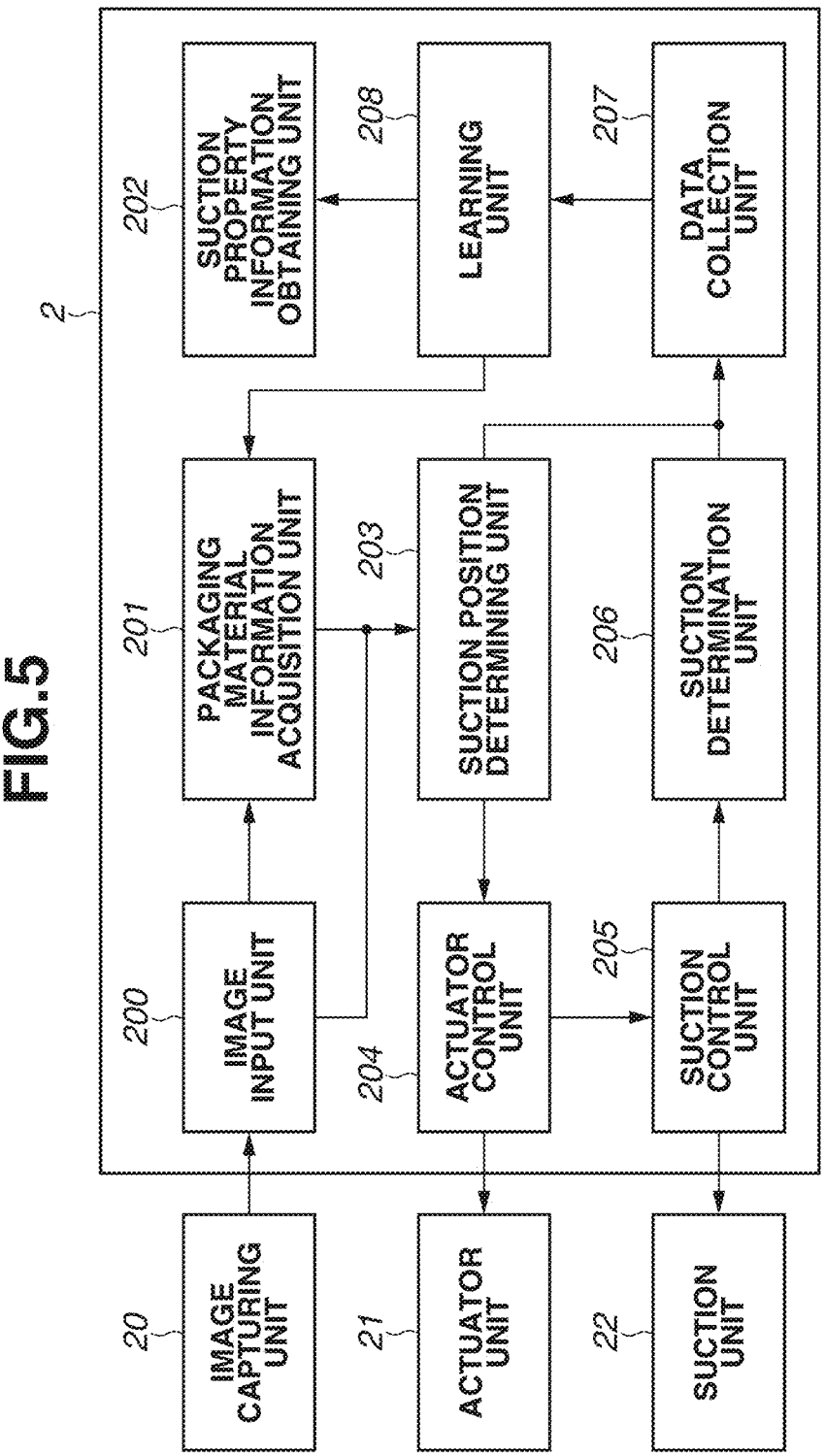
FIG. 5 is a diagram illustrating an example of a device configuration of an information processing apparatus.

FIG. 5 is a diagram illustrating an example of the device configuration of an information processing apparatus 2 in the learning mode. The information processing apparatus 2 in the learning mode is almost similar to the information processing apparatus 1 in the execution mode illustrated in FIG. 2. Functions similar to FIG. 2 are not described. Functions different from FIG. 2, i.e., a packaging material information acquisition unit 201, a suction property information holding unit 202, a suction position determining unit 203, a suction determination unit 206, a data collection unit 207, and a learning unit 208, are described.

The packaging material information acquisition unit 201 obtains a packaging material map and outputs the packaging material map to the suction position determining unit 203. Further, in a case where the result of reclassification of packaging material information and a database necessary for classification are input from the learning unit 208, the packaging material information acquisition unit 201 updates the reclassification result and the database.

The suction property information holding unit 202 holds and updates suction property information input from the learning unit 208.

Based on a color image or a distance image input from an image input unit 200, the packaging material map input from the packaging material information acquisition unit 201, and a request input from the data collection unit 207, the suction position determining unit 203 determines a position and an orientation to be suctioned. The suction position determining unit 203 outputs the determined position and orientation as a suction position to an actuator control unit 204 and the data collection unit 207.

Similarly to the suction determination unit 104 in the execution mode, the suction determination unit 206 determines whether suction is successful or failed. Then, the suction determination unit 206 outputs the suction determination result to the data collection unit 207.

Based on the suction position input from the suction position determining unit 203 and the suction determination result input from the suction determination unit 206, the data collection unit 207 collects teacher data for learning. The data collection unit 207 outputs the collected teacher data group to the learning unit 208. Specifically, the data collection unit 207 collects teacher data including a set of patches of the packaging material map corresponding to patches of the color image and the distance image centered on the suction position, and the suction determination result at the suction position. Further, based on the collected data, in a case where data is biased or data is insufficient, the data collection unit 207 makes a request to preferentially suction a portion having the feature of a packaging material for which data regarding the degree of ease of suction is scarce. That is, the data collection unit 207 sends a request to determine an area of packaging material information necessary for the suction position determining unit 203 as the suction position at a high rate. This can remedy a situation where, when the likelihood of suction in each area of the packaging material map is obtained, the reliability decreases because data for determining the likelihood of suction is not present, or is scarce.

Based on the teacher data group input from the data collection unit 207, the learning unit 208 performs learning. At this time, the learning unit 208 learns the likelihood of suction with respect to packaging material information, i.e., suction property information. The learning unit 208 obtains the packaging material information from patches of the color image and the distance image as input and performs learning using a set of the packaging material information and the suction determination result as teacher data so that when provided with the packaging material information, the learning unit 208 can output the likelihood of suction. As the learning method, a convolutional neural network (CNN) is used. The present invention, however, is not limited to this. For example, a random forest or another learning technique may be used. The learning unit 208 outputs the thus obtained suction property information to the suction property information holding unit 202. Further, the learning unit 208 may change a classification criterion for the packaging material information so that with respect to each piece of the packaging material information, the likelihood of suction is likely to be estimated as either 0 or 1. For example, data regarding the suction determination result may be divided into a data group in which suction is successful and a data group in which suction is failed. Then, in each data group, data classified based on the material feature, such as the material, the thickness, or the tensile strength and the structural feature (e.g., a wrinkle or a hole), may be redefined as the packaging material information. The learning unit 208 outputs the thus obtained result of reclassification of the packaging material information and a database necessary for classification to the packaging material information acquisition unit 201.

<Processing (Learning Mode)>

Figure 6:
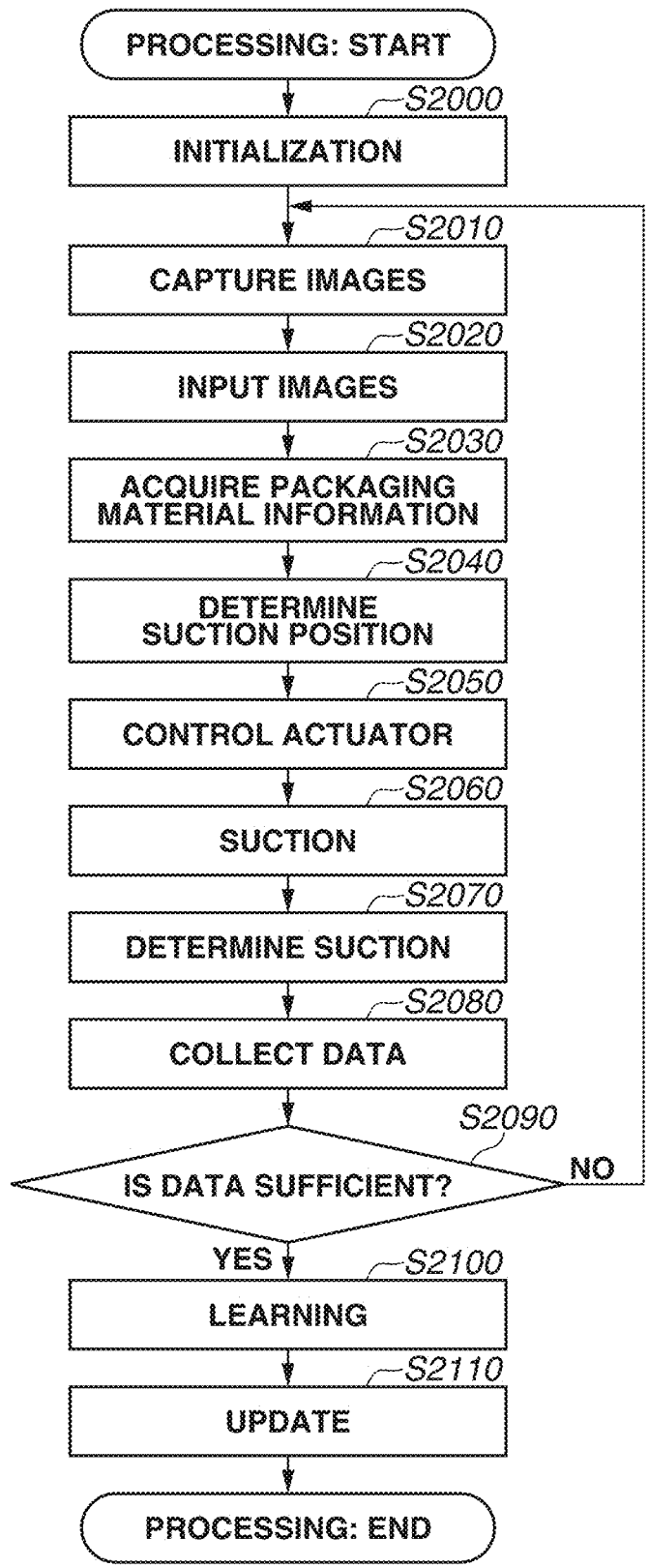
FIG. 6 is a flowchart illustrating a processing procedure performed by an information processing system.

Next, a processing procedure in the learning mode is described. FIG. 6 is a flowchart illustrating a processing procedure performed by the information processing system including the information processing apparatus 2 according to the present exemplary embodiment. The flowchart in the present exemplary embodiment is almost similar to the flowchart in FIG. 4 in the execution mode. Processes similar to those in the execution mode are not described. Processes different from the execution mode, i.e., steps S2030, S2040, S2070, S2080, S2090, S2100, and S2110, are described.

In step S2030, based on the color image, the distance image, and the packaging material information database, the packaging material information acquisition unit 201 acquires a packaging material map in which either image and packaging material information are associated with each other.

In step S2040, based on the packaging material map obtained in step S2030, the color image or the distance image, and a request input from the data collection unit 207, the suction position determining unit 203 determines an suction position. Specifically, similarly to step S1034 or S1035 in the execution mode, the suction position determining unit 203 obtains a suction candidate area. Further, in a case where data of packaging material information A is requested, the suction position determining unit 203 extracts, in the packaging material map, an area that is an area of the packaging material information A and is also the suction candidate area. Then, the suction position determining unit 203 randomly determines the suction position in the extracted area.

In step S2070, the actuator control unit 204 controls an actuator unit 21 to move a suction unit 22 slightly in an up direction. Then, the suction determination unit 206 determines whether the suction is successful by checking vacuum pressure. Then, the suction determination unit 206 outputs the suction determination result to the data collection unit 207. Further, if the suction is successful, the suctioned packaged object 13 is conveyed to the conveyance destination 15. Alternatively, the suctioned packaged object 13 is returned to the original position in the container 14. Yet alternatively, the suctioned packaged object 13 may be conveyed to and placed at another position in the container 14.

In step S2080, based on the suction position input from the suction position determining unit 203 in step S2040 and the suction determination result obtained by the suction determination unit 206 in step S2070, the data collection unit 207 collects teacher data. In this case, the teacher data is an image including information about whether the suction on the suction position is successful or failed.

In step S2090, the data collection unit 207 confirms whether the collected teacher data is sufficient. If a sufficient number and sufficient types of pieces of data are present (YES in step S2090), the processing proceeds to step S2100. If the teacher data is not yet sufficient (NO in step S2090), the processing returns to step S2010, and the process of collecting data is repeated. At this time, in a case where data is biased or data is insufficient in the collected data group, the data collection unit 207 sends a request to determine an area of packaging material information necessary for the suction position determining unit 203 as the suction position at a high rate. Consequently, an area where data is insufficient is preferentially suctioned. Thus, it is possible to efficiently collect teacher data.

In step S2100, based on the teacher data group output from the data collection unit 207 in step S2090, the learning unit 208 performs learning and obtains suction property information. The learning unit 208 outputs the obtained suction property information to the suction property information holding unit 202. Further, in a case where a classification criterion for the packaging material information is changed, the learning unit 208 outputs the result of reclassification of the packaging material information and a database necessary for classification to the packaging material information acquisition unit 201.

In step S2110, the suction property information holding unit 202 updates the suction property information obtained in step S2100. Alternatively, the packaging material information acquisition unit 201 updates the result of reclassification in the packaging material information database (not illustrated) and the database.

By the above processing, the information processing system can learn suction property information in the learning mode.

As described above, in the learning mode, suction property information is obtained by learning in the learning mode of the information processing system. This can provide an information processing system for obtaining and suctioning an optimal position for suction even on a target object in a new packaging material.

<Variations>

In the first exemplary embodiment, an example has been described where the actuator unit 11 and the container 14 are fixed in the scene. The present invention, however, is not limited to this. For example, a pick-and-place task may be performed by placing the actuator unit 11 or the container 14 on a moving apparatus, such as an automatic guided vehicle (AGV). Consequently, if the actuator unit 11 is placed on the moving apparatus, it is possible to convey a packaged object to the conveyance destination 15 even at a distant location. Further, if the container 14 is placed on the moving apparatus, it is possible to take out various types of packaged objects in various containers stored in a warehouse and collect the packaged objects.

In the first exemplary embodiment, an example has been described where the image capturing unit 10 has a camera configuration in which a camera is attached to the actuator unit 11. The present invention, however, is not limited to this. For example, the image capturing unit 10 may have a fixed camera configuration in which a camera is attached to the position where the container 14 and the packaged objects 13 in the container 14 can be measured. In this case, the foundation of the image capturing unit 10 and the actuator unit 11 is calibrated in advance. By using a fixed camera, it is possible to stably obtain the position of a packaged object.

Further, a display unit, such as a display, may be included. For example, the display unit may display a captured image, packaging material information, a packaging material map, suction property information, a suction likelihood map, a suction candidate area, or a suction target map. Further, the display unit may display the next operation step of the robot. Consequently, the user can know the processes of processing and the internal state of the system.

In step S1000 in FIG. 4, an example has been described where the positions and the orientations of the container 14 and the conveyance destination 15 are read when the initialization is performed. The present invention, however, is not limited to this. Alternatively, for example, a scene including the container 14 and the conveyance destination 15 may be captured by the image capturing unit 10 attached to the actuator unit 11 by moving the actuator unit 11. Then, the container 14 and the conveyance destination 15 may be detected from the captured image, thereby obtaining the positions and the orientations of the container 14 and the conveyance destination 15. In a case where a container containing a packaged object is shifted, and even if a camera is moved to predetermined coordinates, the container may not be able to be observed by the camera, or the packaged object may not be able to be placed at a conveyance destination as intended. When the container is shifted, the position and the orientation of the container are obtained again from an image in which the container is observed, whereby it is possible to correct data taking the shift into account.

Figure 13:
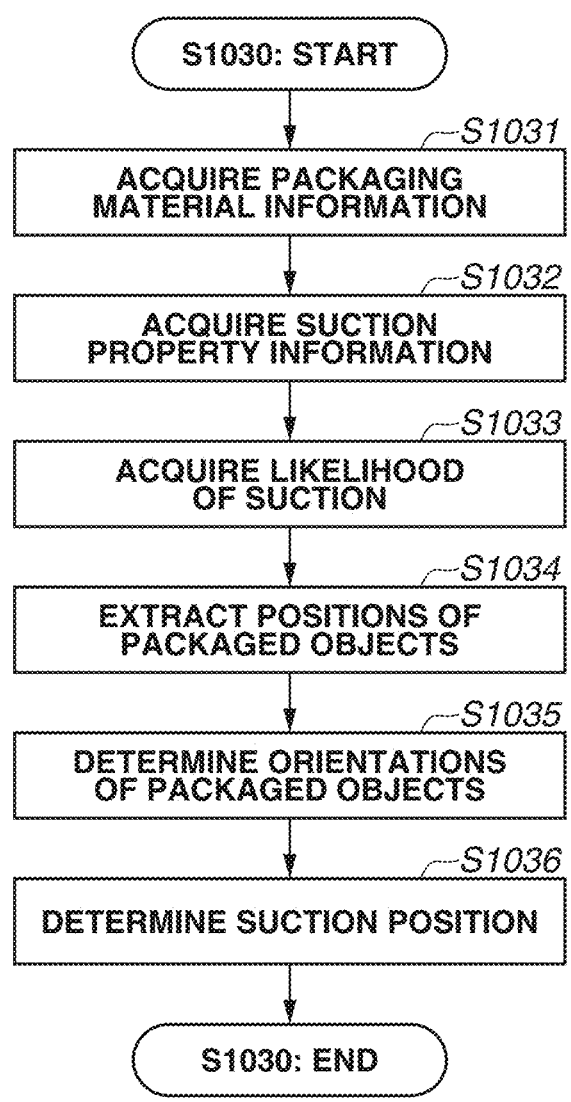
FIG. 13 is a flowchart illustrating a processing procedure performed by a determining unit.

In step S1031 in FIG. 13, an example has been described where the packaging material information acquisition unit 1011 collates either image with the packaging material information database, thereby acquiring packaging material information. The present invention, however, is not limited to this. Alternatively, for example, image processing or feature extraction may be performed based on the color image and the distance image, and the material feature, such as the thickness or the transparency of the packaging material, may be estimated, and the structural feature, such as a wrinkle or a hole, on the packaging material may be further estimated. These pieces of information may be converted into numerical values, and the numerical values are arranged, thereby generating a packaging material information vector. For example, in a case where the fact that the packaging material is nylon is acquired from the images, the packaging material information vector holds information indicating that a wrinkle on the packaging material is a portion having many white and linear features according to the properties of nylon. The combination of the two features increases information about the state of the packaging material. Thus, it is possible to obtain an area suitable for suction with higher accuracy. Alternatively, a network model to which the color image or the distance image is input and which outputs a packaging material map may be used. That is, by using a learned model to which an image is input and which thereby outputs the state of the surface of the packaging material, a packaging material map (the state of the surface of the packaging material) is obtained. As such a network model, a model to and from which images are input and output, such as a CNN, is used. A large amount of packaging material information or data of a packaging material map corresponding to a color image or a distance image and a scene of the image may be prepared and learned in advance. By using learning, it is possible to acquire a position suitable for suction with high accuracy. Alternatively, the packaging material information acquisition unit 1011 may directly acquire data as the material feature regarding the packaging material from the user. An error may occur when a packaging material map is estimated. If, however, the type of the packaging material is known in advance, the user inputs the type of the packaging material, whereby it is possible to prevent an error. The type of the packaging material is, for example, data such as polyethylene, a thickness of 0.01 mm, and a tensile strength of 7.0 kg/mm2 as the softness. At this time, the structural feature may be obtained as a vector feature of a finite degree based on the distribution of edges or differences in levels in the color image or the distance image.

In step S1033 in FIG. 13, an example has been described where the suction property information acquisition unit 1012 generates a suction likelihood map using a table of the suction property information. The present invention, however, is not limited to this. Alternatively, for example, the suction property information held in the holding unit 105 may be a formula or a table for obtaining the degree of ease of suction from a packaging material information vector. Yet alternatively, using a CNN model to which the packaging material information is input and which outputs the likelihood of suction, many correspondence data sets of the packaging material information and the likelihood of suction may be prepared and learned in advance.

In step S1030 in FIG. 13, a description has been given of a two-stage process in which the determining unit 101 acquires packaging material information, thereby generating a packaging material map and further generating an suction likelihood map using a table of the likelihood of suction. The present invention, however, is not limited to this. Alternatively, for example, the suction likelihood map may be generated by directly applying the likelihood of suction to the packaging material information not via the packaging material map. In this case, steps S1031 to S1033 are combined together. Such a process is suitable for a case where a material having a correlation between color information and the degree of ease of suction is used as a packaging material. Yet alternatively, a database in which suction property information is associated with a packaging material information database in advance may be used. This database is created by associating the likelihood of suction with various variations of data of packaging material information. For example, the database is provided with information such as the likelihood of suction in a case where the material of a packaging material is vinyl and has many wrinkles. Yet alternatively, by using a learned model to which an image is input and which thereby outputs the degree of ease of suction of a packaged object included in the image, the likelihood of suction may be acquired.

In steps S1034 and S1035 in FIG. 13, the packaging materials are recognized and a suction position is determined in the entirety of the captured scene. The present invention, however, is not limited to this. Alternatively, for example, using the fact that the position and the orientation of the container 14 are known, and the packaged objects 13 are in the container 14, the ranges of recognition and detection may be limited to within the container 14. This can shorten the time required for recognition and detection and reduce the amount of memory to be used.

In step S1035 in FIG. 13, an example has been described where the position/orientation extraction unit 1013 obtains an suction candidate area from an area that is located on the near side and does not interfere with another packaged object 13 among the packaged objects 13. The present invention, however, is not limited to this. Alternatively, for example, a normal to each pixel may be obtained from the distance image. Then, the more toward a surface that is easy to suction (the direction in which the opening of the container 14 opens) the normal is, the more suitable as a suction candidate the packaged object 13 may be. Yet alternatively, to prevent interference or friction with the container 14, the further away from the side surface of the container 14, the more suitable as a suction candidate the packaged object 13 may be. Yet alternatively, using information regarding the position or the size of the container 14, a candidate for a packaged object 13 that is easy to take out may be detected. A packaged object 13 located at a position near the inner end of the container 14 may cause the suction unit 12 to hit the end of the container 14. Specifically, in a case where the distance between the end of the container 14 and a packaged object 13 is greater than the size of the suction unit 12 (or a suction pad) or the size of the packaged object 13, the information indicating that the packaged object 13 can be suctioned is reflected on a suction candidate area. By taking into account also the position of the container 14, it is possible to perform stable suction. Yet alternatively, factors, such as the fact that nothing interferes with a packaged object 13 on the near side, that a surface corresponding to a normal is appropriate, and that a packaged object 13 is away from the inner end of the container 14 may be each converted into a numerical value. Then, on the premise that the higher the numerical value, the more appropriate as an suction candidate area the packaged object 13 is, the suction candidate area may be obtained based on the weighted linear sum of these numerical values. Further, in step S1036, the suction likelihood map may also be represented by a weighted linear sum, thereby obtaining a suction target map.

Further, in step S1036 in FIG. 13, an example has been described where a mask process is performed on the suction candidate area, thereby generating a suction target map. The present invention, however, is not limited to this. Alternatively, for example, in step S1034, the likelihood of detection in template matching or the degree of ease of suction in the distance image may be converted into a numerical value, and a suction candidate area may be obtained as a map including a numerical value indicating the degree of ease of suction in each area. In this case, by a calculation to take the product of corresponding areas between the suction candidate area and the suction likelihood map, a suction target map may be generated.

In step S1035 in FIG. 13, an example has been described where after the position/orientation extraction unit 1013 obtains an suction candidate area, the suction candidate area is combined with the suction likelihood map, thereby generating a suction target map. The present invention, however, is not limited to this. Alternatively, for example, in the suction likelihood map, only an area equal to or greater than a threshold may be extracted, and a packaged object 13 may be detected in the extracted area, thereby generating a suction target map. Thus, it is possible to reduce processing load.

In step S1034 in FIG. 13, an example has been described where the position/orientation extraction unit 1013 detects the packaged objects 13 by template matching. The present invention, however, is not limited to this. Alternatively, for example, a CNN model to which the color image or the distance image is input and which outputs the positions and the orientations of the packaged objects 13 may be used. In this case, many correspondence data sets of the color image and the distance image and the positions and the orientations of the packaged objects 13 may be prepared and learned in advance.

In steps S1040 and S1050 in FIG. 4, an example has been described where the suction unit 12 is controlled to start suction after coming into close contact with the packaged object 13. The present invention, however, is not limited to this. Alternatively, for example, the suction unit 12 may start suction before coming into close contact with the packaged object 13. Then, the suction unit 12 may come close to the packaged object 13 while performing suction, and come into close contact with the packaged object 13. Consequently, depending on the packaging material of the packaged object 13, the suction success rate may increase.

In step S1080 in FIG. 4, an example has been described where, if the suction is not successful during the conveyance, it is determined that the packaged object 13 is dropped, and images are captured again. The present invention, however, is not limited to this. The point of drop can be predicted by sequentially determining suction. Thus, images may be captured near the predicted point of drop, and the detected packaged object 13 may be conveyed by suctioning the packaged object 13 by similar processing. If suction is determined in a short cycle, it is possible to find the approximate timing when a target object separates from the suction unit 12. As a result, the position of the target object at the timing when the target object separates from the suction unit 12, and the velocity of the target object at that time (i.e., the velocity of the suction unit 12 at the end of the robot arm) can be found. Using the found position and velocity, the separation of the target object is calculated as a falling motion having an initial velocity, whereby the point of drop can be predicted. Consequently, even if the packaged object 13 is dropped during the conveyance, it is possible to convey the packaged object 13 to the conveyance destination 15 without losing the packaged object 13. Further, if the packaged object 13 is damaged by being dropped, and there is no point in conveying the packaged object 13 to the conveyance destination 15, the packaged object 13 may be conveyed to a dropped object collection portion. Alternatively, in a case where the packaged object 13 is dropped, the processing may return to step S1030. In step S1030, a second candidate may be set anew as a suction position in the suction target map, and the subsequent processing may continue. Consequently, it is possible to efficiently perform the task.

In steps S1060 and S1080 in FIG. 4, an example has been described where the suction determination unit 104 thereby determines whether the suction is successful or failed by checking vacuum pressure. The present invention, however, is not limited to this. Alternatively, for example, the suction unit 12 may be captured using an imaging apparatus such as a camera, and it may be confirmed whether the packaged object 13 is being conveyed, remaining in contact with the suction unit 12, thereby determining the suction. The image capturing unit 10 may also serve as the imaging apparatus. Even in a case where a vacuum pressure gauge breaks down, it is possible to determine the suction and stably convey the packaged object 13. Yet alternatively, the suction unit 12 may include a weight scale (not illustrated), and when the suction unit 12 suctions the packaged object 13, the weight of the object suctioned by the suction unit 12 may be measured, thereby determining the suction. Further, to some robot arm, after a command to "move to a position A" is given, an interrupt command to perform another operation ("move to a position B, not the position A") can be given during the movement. To some robot arm, such an interrupt command cannot be given. In a case where an interrupt command can be given, and the processing should return to step S1010 as soon as possible, the suction may be confirmed every t milliseconds (or at each moving distance). In a case where an interrupt command cannot be given, and even if the suction is confirmed every t milliseconds (or at each moving distance), the next command cannot be given until the robot arm reaches the position A. Thus, a method for confirming the suction when the robot arm reaches the position A (confirming the suction at each via point during the conveyance) is desirable. The user may make a setting in advance so that the suction is confirmed at an optional timing.

In step S2040 in FIG. 6, a description has been given of a method in which based on the packaging material map and a request, the suction position determining unit 203 determines a suction position. The present invention, however, is not limited to this. Alternatively, for example, the processing may proceed similarly to the execution mode, and based on the suction property information at the current time, the suction property information holding unit 202 may obtain a suction likelihood map and determine a suction position with reference to the suction likelihood map. Further, the suction property information holding unit 202 may obtain a suction candidate position, and the suction position determining unit 203 may obtain a suction target map and determine a suction position with reference to the suction target map. Consequently, it is possible to efficiently collect data while selecting an area where the possibility of suction is high or an area where the possibility of suction is low. Yet alternatively, a suction position may be randomly determined in the container 14. Yet alternatively, the user may directly specify a suction position, thereby determining the suction position. In this case, the display unit H16 displays a captured image or information regarding the packaging material map, and the user may specify the suction position using a touch panel.

An example has been described where learning is performed at the timing when the data collection unit 207 collects sufficient data. The present invention, however, is not limited to this. For example, learning may be performed by setting a reward in the framework of reinforcement learning. Specifically, the learning unit 208 can edit the suction property information held in the suction property information holding unit 202. The learning unit 208 edits the suction property information and then performs a pick-and-place task similar to that in the execution mode. If the success rate increases, a positive reward is given. If the success rate decreases, a negative reward is given. The editing and the task are repeated in this manner, whereby it is possible to learn suction property information leading to a high success rate. The present invention, however, is not limited to this. Alternatively, the learning unit 208 may be able to further edit the classification of the packaging material information. As a method for determining whether sufficient teacher data is collected, there is a method for dividing collected data into learning data and test data. Learning is performed using the learning data, and the learning data is applied to the test data. If the accuracy rate is equal to or greater than a threshold, it is determined that the collected data is sufficient.

In the first exemplary embodiment, an example has been described where an information processing system using a particular suction unit performs a pick-and-place task or learning. In contrast, in a second exemplary embodiment, regarding a case where an information processing system includes an suction switching unit and performs a pick-and-place task while switching suction units, examples of an execution mode and a learning mode are described. In the present exemplary embodiment, the information processing system includes a plurality of suction units different in size or material. The present exemplary embodiment is also applicable to a case where an information processing system includes a suction unit in which a plurality of suction pads is integrated together, and switches areas to be suctioned. For example, in a case where a small target object or a target object in which a flat surface that can be suctioned is small is treated, and the target object cannot be suctioned due to air leak between the surface to be suctioned and a suction pad unless the suction pad of which an suction unit has a small contact surface is used. Thus, the suction unit is switched to a suction unit having a small diameter. Further, in a case where a large and heavy object is suctioned, the object can be stably conveyed using an suction unit in which the flow rate of air to be suctioned is great, or by increasing the number of fulcrums in an suction unit in which a plurality of suction pads is integrated together. That is, by selecting an appropriate suction unit according to the packaged object as a target to be suctioned, it is possible to perform a pick-and-place task more robustly. The configuration of the information processing system according to the present exemplary embodiment is similar to that of the information processing system 10000 according to the first exemplary embodiment illustrated in FIG. 1 and therefore is omitted.

<Configuration of Information Processing Apparatus (Learning Mode)>

Figure 7:
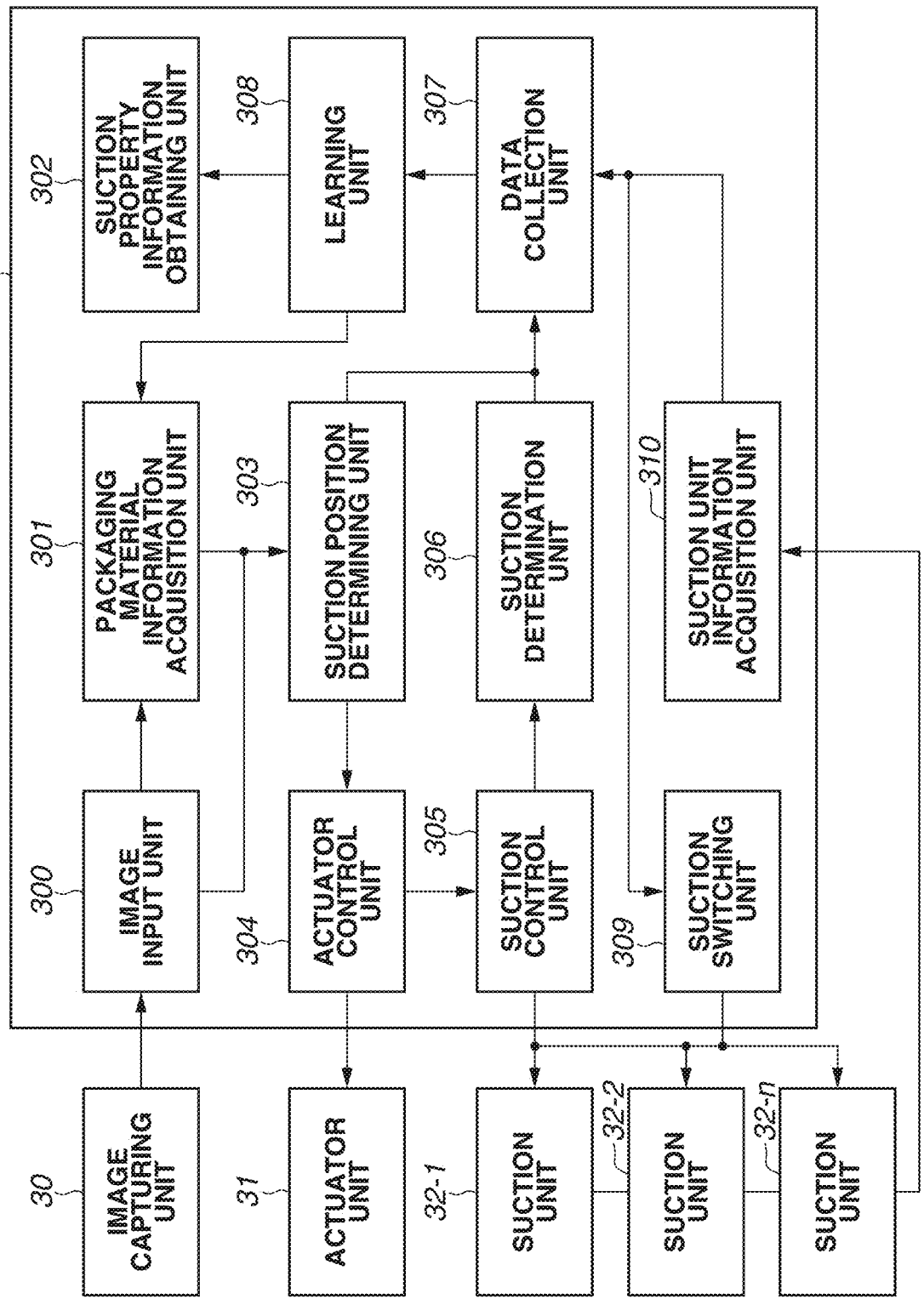
FIG. 7 is a diagram illustrating an example of a functional configuration of an information processing apparatus in a case where a learning mode is selected.

FIG. 7 is a diagram illustrating an example of the device configuration of an information processing apparatus 3 in a case where between the learning mode and the execution mode, the learning mode is selected by a mode switching unit (not illustrated) in the present exemplary embodiment. The information processing apparatus 3 in the learning mode in the present exemplary embodiment is almost similar to the information processing apparatus 2 illustrated in FIG. 5 in the first exemplary embodiment (the learning mode). Functions similar to FIG. 5 are not described. Functions different from FIG. 5, i.e., a suction unit information acquisition unit 310, a data collection unit 307, a suction switching unit 309, and a learning unit 308, are described. The information processing apparatus 3 includes n suction units having suction pads different in size, i.e., suction units 32-1, 32-2, and 32-n.

The suction unit information acquisition unit 310 acquires information (a suction feature) regarding the suction units 32 from the suction units 32 and outputs the acquired information to the data collection unit 307. In this case, the information regarding the suction units 32 is shape information such as the sizes and the diameters of the suction pads and the presence or absence of a fold, and information regarding the materials of the suction pads.

Based on an suction position input from the suction position determining unit 303, an suction determination result input from an suction determination unit 306, and the suction unit information input from the suction unit information acquisition unit 310, the data collection unit 307 collects teacher data for learning. The data collection unit 307 outputs the collected teacher data group to the learning unit 308. Further, based on the collected data, in a case where data is biased or data is insufficient, the data collection unit 307 makes a request to preferentially suction a portion where the biased or insufficient data is present. The data collection unit 307 sends a request to determine an area of packaging material information necessary for the suction position determining unit 303 as the suction position at a high rate. Further, the data collection unit 307 sends a request to switch the suction units 32 according to suction unit information necessary for the suction switching unit 309. This can remedy a situation where, when the likelihood of suction regarding suction units is obtained, the reliability decreases because data of a particular suction unit is not present, or is scarce.

If the suction switching unit 309 receives, from the data collection unit 307, a request to switch the suction units 32, the suction switching unit 309 switches the suction units 32. In a case where a plurality of switching candidates is present, a candidate to be switched is written in the request sent from the data collection unit 307. As a method for switching the suction units 32, a configuration is employed in which each of the suction units 32 and the end of an actuator unit 31 are joined together by a hand changer. An actuator control unit 304 controls the actuator unit 31 to perform the operation of detaching the current suction unit 32 and attaching a new suction unit 32. The switching method, however, is not limited to this. Alternatively, a plurality of suction units 32 may be built into the actuator unit 31 and switched. Yet alternatively, on a display unit (not illustrated), display may be performed that prompts the user to switch the suction units 32, and then, the user may switch the suction units 32.

Based on the teacher data group input from the data collection unit 307, the learning unit 308 performs learning. At this time, the learning unit 308 learns suction property information with respect to packaging material information and the suction unit information. Regardless of a plurality of pieces of suction unit information, the learning unit 308 performs learning using a single learned model. The learned model in the present exemplary embodiment outputs, based on an input image, the position of an object that is easy to suction. The learning unit 308 outputs the learned suction property information to the suction property information holding unit 302.

<Processing (Learning Mode)>

Figure 8:
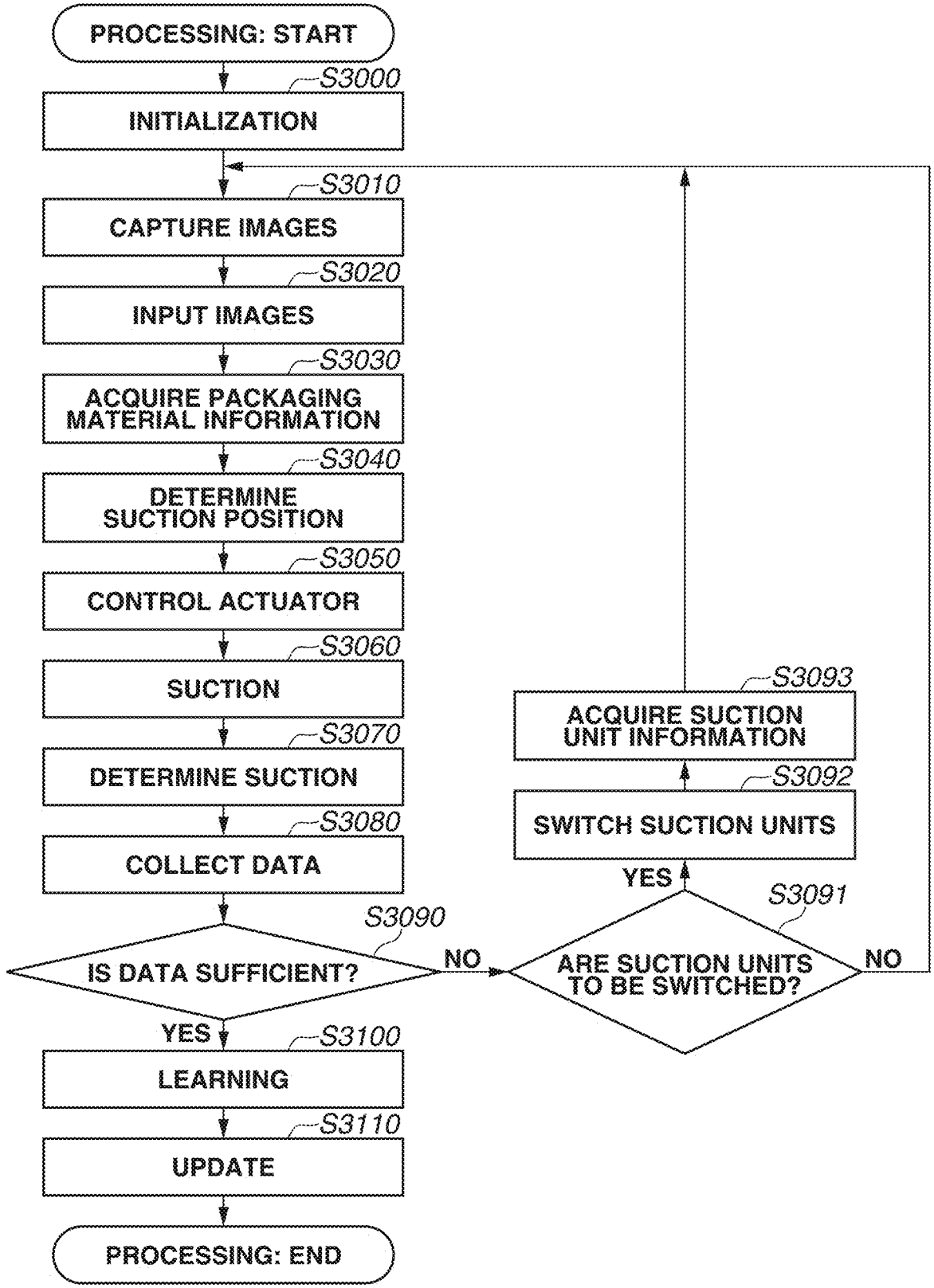
FIG. 8 is a flowchart illustrating a processing procedure performed by an information processing system in the learning mode.

Next, a processing procedure in the learning mode in the present exemplary embodiment is described. FIG. 8 is a flowchart illustrating a processing procedure performed in the learning mode by the information processing system including the information processing apparatus 3 according to the present exemplary embodiment. The flowchart in the present exemplary embodiment is almost similar to the flowchart in FIG. 6 in the first exemplary embodiment. Processes similar to the flowchart in FIG. 6 are not described. Processes different from the flowchart in FIG. 6, i.e., steps S3000, S3080, S3090, S3091, S3092, and S3093, are described.

In step S3000, similarly to step S2000 in the first exemplary embodiment, the system is initialized. In addition to the process of step S2000, the suction unit information acquisition unit 310 acquires suction unit information regarding the current suction unit 32.

In step S3090, the data collection unit 307 confirms whether the collected teacher data is sufficient. If a sufficiently number and sufficient types of pieces of data are present (YES in step S3090), the processing proceeds to step S3100. If the teacher data is not yet sufficient (NO in step S3090), the processing proceeds to step S3091.

In step S3091, based on the collected teacher data, the data collection unit 307 determines whether the suction units 32 are to be switched. The condition for determining that the suction units 32 are to be switched is that sufficient data is collected for the current suction unit 32, and data is insufficient for the other suction units 32. If the suction units 32 are to be switched (YES in step S3091), the processing proceeds to step S3092. At this time, the data collection unit 307 sends a request to the suction switching unit 309 to switch the suction units 32. If the suction units 32 are not to be switched (NO in step S3091), the processing returns to step S3010, and the process of collecting data is repeated. At this time, in a case where data is biased or data is insufficient in the collected data group, the data collection unit 307 sends a request to determine an area of packaging material information necessary for the suction position determining unit 303 as the suction position at a high rate.

In step S3092, the suction switching unit 309 switches the suction units 32, and the processing proceeds to step S3093.

In step S3093, the suction unit information acquisition unit 310 acquires information regarding the switched suction unit 32, and the processing returns to step S3010. Then, the process of collecting data is repeated.

By the above processing, the information processing system can learn suction property information by collecting teacher data while switching the suction units 32 in the learning mode.

<Configuration of Information Processing Apparatus (Execution Mode)>

Figure 9:
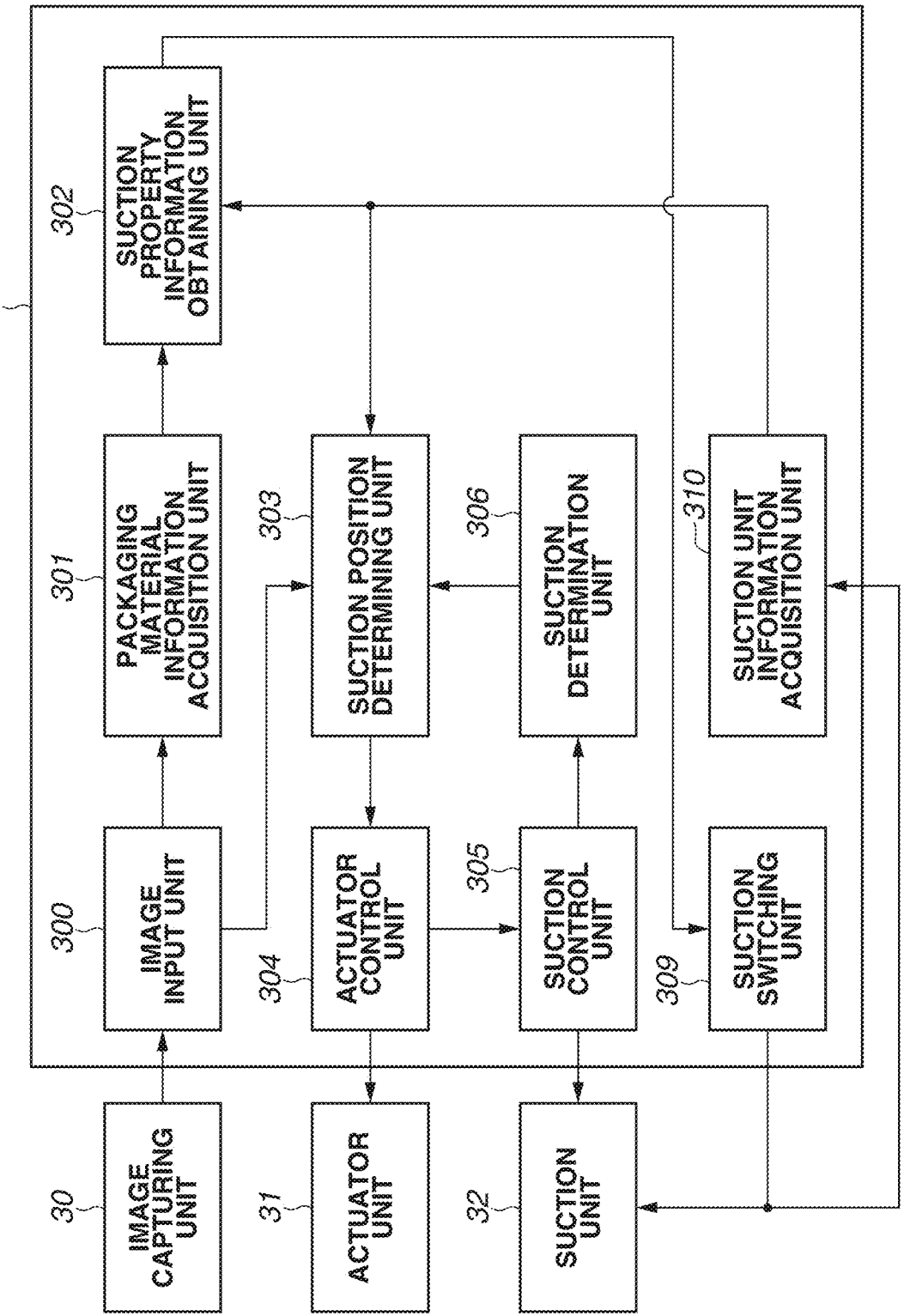
FIG. 9 is a diagram illustrating an example of a device configuration of an information processing apparatus in a case where an execution mode is selected.

FIG. 9 is a diagram illustrating an example of the device configuration of an information processing apparatus 3 in a case where between the learning mode and the task execution mode, the execution mode is selected by the mode switching unit (not illustrated) in the present exemplary embodiment. The information processing apparatus 3 in the execution mode in the present exemplary embodiment is almost similar to the information processing apparatus 1 illustrated in FIG. 2 in the first exemplary embodiment. Functions similar to FIG. 2 are not described. Functions different from FIG. 2, i.e., a packaging material information acquisition unit 301, a suction property information holding unit 302, a suction position determining unit 303, a suction unit information acquisition unit 310, and a suction switching unit 309, are described.

Based on a color image or a distance image input from an image input unit 300, the packaging material information acquisition unit 301 acquires information regarding the packaging materials of the packaged objects 13. The packaging material information acquisition unit 301 outputs the acquired packaging material information as a packaging material map to the suction property information holding unit 302.

Based on the packaging material map input from the packaging material information acquisition unit 301 and suction unit information input from the suction unit information acquisition unit 310, the suction property information holding unit 302 references suction property information held in the suction property information holding unit 302, thereby obtaining an suction likelihood map. Further, if it is determined that the likelihood of suction of the current suction unit 32 is low in the obtained suction likelihood map, the suction property information holding unit 302 sends a request to the suction switching unit 309 to switch the current suction unit 32 to an suction unit 32 leading to a high likelihood of suction, and generates an suction likelihood map based on the switched suction unit 32. The suction property information holding unit 302 outputs the obtained suction likelihood map to the suction position determining unit 303.

Based on the color image or the distance image input from the image input unit 300, the suction likelihood map input from the suction property information holding unit 302, and an suction determination result input from the suction determination unit 306, the suction position determining unit 303 obtains a suction target map (a candidate to be suctioned). Then, the suction position determining unit 303 determines, as a suction position, a position having the highest likelihood of suction in the suction target map and outputs the suction position to an actuator control unit 304.

The suction unit information acquisition unit 310 acquires information regarding the suction units 32 from the suction units 32 and outputs the acquired information to the suction property information holding unit 302. The information regarding the suction units 32 refers to, for example, the diameter size and the material of an suction pad of each of a plurality of suction units 32 that can be switched, and the degree of ease of suction with respect to the states of the packaging materials.

If the suction switching unit 309 receives from the suction property information holding unit 302 a request to switch the suction units 32, the suction switching unit 309 switches the suction units 32. The switching method is described above, and therefore is not described here.

<Processing (Execution Mode)>

Figure 10:
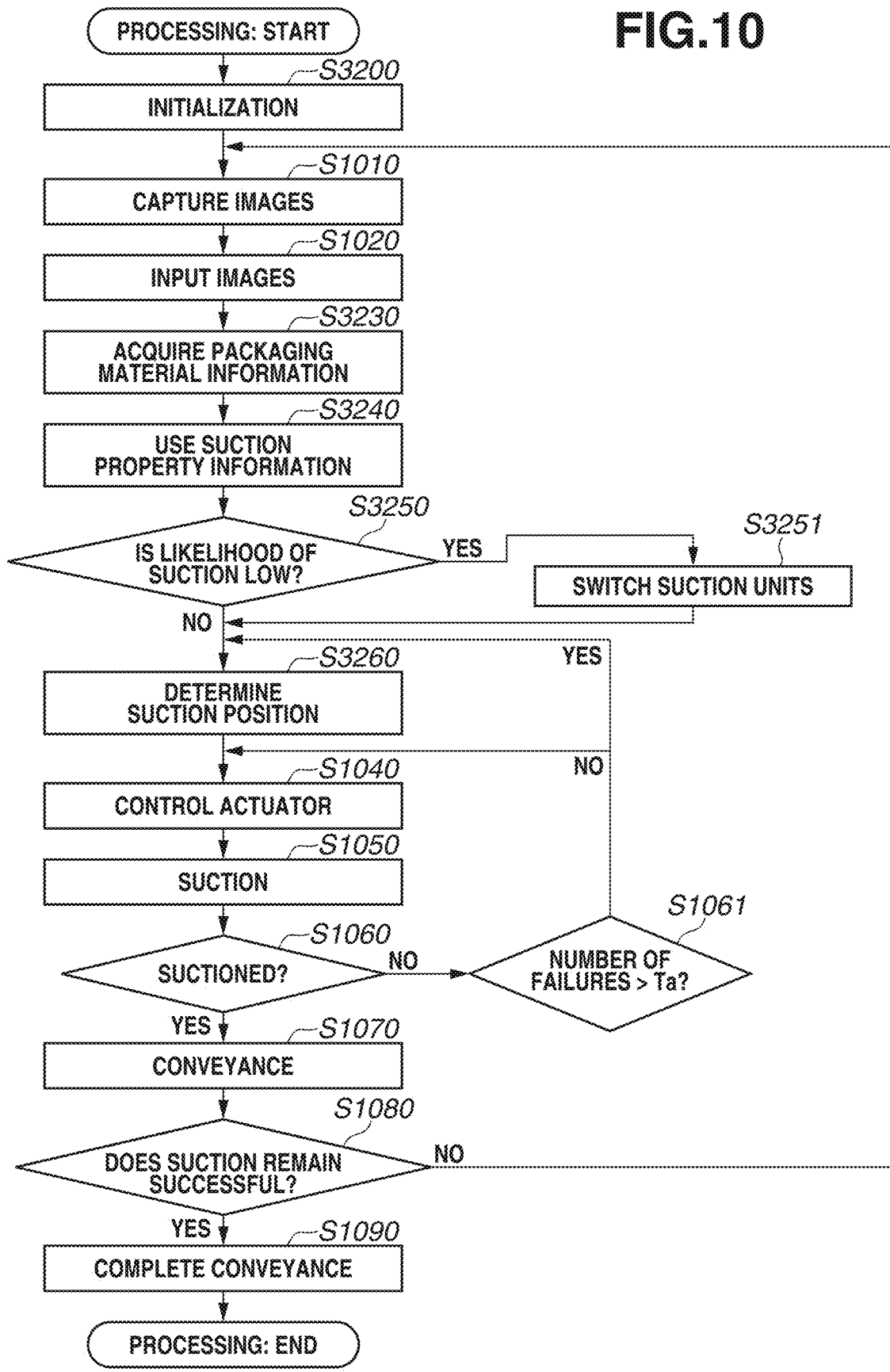
FIG. 10 is a flowchart illustrating a processing procedure performed by an information processing system in the execution mode.

Next, a processing procedure in the execution mode in the present exemplary embodiment is described. FIG. 10 is a flowchart illustrating a processing procedure performed in the task execution mode by the information processing system including the information processing apparatus 3 according to the present exemplary embodiment. The flowchart in the present exemplary embodiment is almost similar the flowchart in FIG. 4 in the first exemplary embodiment. Processes similar to the flowchart in FIG. 4 are not described. Processes different from the flowchart in FIG. 4, i.e., steps S3200, S3230, S3240, S3250, S3251, and S3260, are described.

In step S3200, similarly to step S1000 in the first exemplary embodiment, the system is initialized. In addition to the process of step S1000, the suction unit information acquisition unit 310 acquires suction unit information regarding the current suction unit 32.

In step S3230, based on the color image and the distance image, the packaging material information acquisition unit 301 acquires packaging material information. The packaging material information acquisition unit 301 acquires the packaging material information in each area of either image, thereby obtaining a packaging material map.

In step S3240, the suction property information holding unit 302 uses suction property information, which is a correspondence table indicating the correspondence between the packaging material information and a numerical value indicating the degree of ease of suction (the likelihood of suction), with respect to the packaging material map obtained in step S3230. Then, the suction property information holding unit 302 converts each area of the packaging material map into the likelihood of suction, thereby generating a suction likelihood map.

In step S3250, the suction property information holding unit 302 determines whether the likelihood of suction of the current suction unit 32 is low in the obtained suction likelihood map. The condition for determining that the likelihood of suction is low is that an area having a smaller likelihood of suction than a threshold Tb is less than or equal to a ratio Rm with respect to the entirety of the suction likelihood map. The condition for determining that the likelihood of suction is low, however, is not limited to this. Alternatively, the condition may be that the maximum value of the likelihood of suction is smaller than a threshold, or that the sum of the likelihoods of suction in the suction likelihood map is smaller than a threshold. If it is determined that the likelihood of suction is low (YES in step S3250), the suction property information holding unit 302 sends a request to the suction switching unit 309 to switch to an suction unit 32 leading to a high likelihood of suction. Then, the suction property information holding unit 302 generates a suction likelihood map based on the switched suction unit 32, and the processing proceeds to step S3251. If it is not determined that the likelihood of suction is low (NO in step S3250), the processing proceeds to step S3260.

In step S3251, based on the request sent from the suction property information holding unit 302 in step S3250, the suction switching unit 309 switches the suction units 32. Then, the processing proceeds to step S3260.

In step S3260, based on the suction likelihood map obtained in step S3240 and the color image or the distance image, the suction position determining unit 303 determines an suction position. Specifically, the suction position determining unit 303 extracts, from the color image, features for detecting the packaged objects 13 piled in the container 14 and matches the extracted features with a template indicating the feature of a packaged object 13, thereby identifying the positions of the packaged objects 13. In this case, the template is obtained by observing a packaged object 13 in various orientations and associating features with the orientations of the packaged object 13. If the features resemble each other, the template indicates that the packaged object 13 is in similar orientation states. Further, in the distance image, the suction position determining unit 303 identifies the positions of, among the piled packaged objects 13, packaged objects 13 that are located on the near side and do not interfere with another packaged object 13, and obtains the orientations of the packaged objects 13 three-dimensionally from the distance image. Further, the suction position determining unit 303 obtains a suction candidate area by, based on the orientations of the packaged objects 13, limiting the packaged objects 13 to a packaged object 13 in which a surface that can be suctioned is present. Then, in the suction likelihood map, the suction position determining unit 303 performs a mask process on the suction candidate area, thereby generating a suction target map. That is, using as a mask a two-dimensional image in which the obtained suction candidate area is 1 and other areas are 0, the suction position determining unit 303 takes the product of a pixel of the mask and a pixel of the suction likelihood map, thereby generating the suction target map. Further, with reference to a failure list, the suction position determining unit 303 reduces the numerical value of an area that is difficult to suction on the suction target map, thereby updating the suction target map with the area as an area that is difficult to suction. Then, the suction position determining unit 303 outputs, to the actuator control unit 304, a position having the highest likelihood of suction in the suction target map as the suction position.

By the above processing, the information processing system can perform suction with a higher suction success rate while switching the suction units 32 in the execution mode.

As described above, in the second exemplary embodiment, in each of the learning mode and the task execution mode of the information processing system, it is possible to perform a pick-and-place task with a further increased suction success rate by switching suction units. Further, it is possible to perform learning also including suction unit information to further increase the suction success rate.

<Variations>

In steps S3000 and S3200, an example has been described where the suction unit information acquisition unit 310 acquires suction unit information regarding the current suction unit 32. The present invention, however, is not limited to this. Alternatively, for example, the suction unit information acquisition unit 310 may acquire suction unit information regarding all suction units 32 that can be switched. In this case, in step S3093, it is not necessary to acquire the suction unit information again. Thus, after step S3092, the processing may directly return to step S3010 not via step S3093.

In the execution mode, in step S3250, an example has been described where, if the likelihood of suction is low in the suction likelihood map, the suction units 32 are switched. The present invention, however, is not limited to this. Alternatively, for example, the process of step S3260 may be performed first, and the suction position determining unit 303 may obtain a suction position. Then, if the likelihood of suction on the suction position is low, the suction units 32 may be switched.

In the execution mode, an example has been described where, if the likelihood of suction of the current suction unit 32 is low in the suction likelihood map, a request is sent to switch to an suction unit 32 leading to a high likelihood of suction. The present invention, however, is not limited to this. Alternatively, for example, a set of a suction unit 32 leading to a high likelihood of suction and a suction likelihood map may be generated from the start, and a request may be sent to the suction switching unit 309 to switch the suction units 32.

As a variation other than the above, the suction property information holding unit 302 generates an suction likelihood map based on an suction unit 32 leading to a high likelihood of suction and an suction likelihood map based on the current suction unit 32 and sends the suction likelihood maps to the suction position determining unit 303. Further, the suction unit information acquisition unit 310 obtains the cost of the case where the suction switching unit 309 switches the current suction unit 32 to the suction unit 32 leading to a high likelihood of suction. Then, the suction unit information acquisition unit 310 sends the obtained cost to the suction position determining unit 303. Then, the suction position determining unit 303 generates suction target maps from the respective suction likelihood maps. Further, regarding the two suction target maps or suction positions in the respective suction target maps, the suction position determining unit 303 compares the cost of the case where the suction units 32 are switched with the benefit of the improvement in the likelihood of suction by switching the suction units 32, thereby determining whether the suction units 32 should be switched. If it is comprehensively appropriate to switch the suction units 32, the suction position determining unit 303 sends a request to the suction switching unit 309, thereby switching the suction units 32. If it is not comprehensively appropriate to switch the suction units 32, suction is performed using the current suction unit 32. Consequently, taking into account also the cost of switching the suction unit 32, it is possible to perform a pick-and-place task by robustly suctioning a packaged object 13. The cost of the case where the suction units 32 are switched refers to the time taken to switch the suction units 32. The benefit of the improvement in the likelihood of suction refers to an expectation value indicating the possibility of, by the improvement in the likelihood of suction, reducing the time unnecessarily used due to the failure of suction.

In the execution mode, an example has been described where the suction property information holding unit 302 holds suction property information related to suction unit information regarding the suction units 32. The present invention, however, is not limited to this. For example, in a case where an suction unit 32 regarding which suction property information is not held (for which learning has not been performed) is used, then with respect to suction unit information acquired by the suction unit information acquisition unit 310, the suction property information may be estimated by performing interpolation using suction unit information regarding an suction unit 32 for which learning has been performed. Consequently, it is possible to robustly obtain the likelihood of suction of even an unknown suction unit.

In the first exemplary embodiment, an example has been described where a position that is likely to be suctioned is obtained based on information regarding the packaging material, and then, suction is performed. In contrast, in a third exemplary embodiment, an example is described where, in a case where an area that is likely to be suctioned is not found by estimation based on packaging material information, measures are taken against this case to increase an area that can be suctioned, thereby executing a pick-and-place task. For example, in a case where a pick-and-place task is performed by suction, it is desirable to perform suction at a position corresponding to the center of gravity of an object as a suction target. However, in a case where there are many wrinkles near the center of gravity of the object, the suction may be failed. In response, in the present exemplary embodiment, suction is performed by smoothing out a wrinkle in a portion suitable for the suction to remove the wrinkle. As a specific method for taking measures, in a packaging material as a target, a portion where a wrinkle occurs is identified, and an actuator unit is controlled to smooth out the wrinkle on the packaging material, thereby creating an area that can be suctioned. The configuration of an information processing system according to the present exemplary embodiment is similar to that of the information processing system 10000 according to the first exemplary embodiment illustrated in FIG. 1 and therefore is omitted.
<Configuration of Information Processing Apparatus>

An example of the device configuration of an information processing apparatus according to the present exemplary embodiment is almost similar to that of the information processing apparatus 3 according to the second exemplary embodiment illustrated in FIG. 9. Functions similar to in FIG. 9 are not described. Functions different from FIG. 9, i.e., a suction position determining unit 303 and an actuator control unit 304, are described.

Similarly to the suction position determining unit 303 according to the second exemplary embodiment, the suction position determining unit 303 obtains a suction target map. Then, the suction position determining unit 303 determines whether an area that can be suctioned is present or absent. If an area that can be suctioned is present, the suction position determining unit 303 determines, as a suction position, a position having the highest likelihood of suction and outputs the suction position to the actuator control unit 304. Further, if an area that can be suctioned is not present, then based on an suction likelihood map, the suction position determining unit 303 determines an suction position for taking measures against a wrinkle and outputs the suction position to the actuator control unit 304.

If the suction position determining unit 303 determines that an area that can be suctioned is present, then similarly to the actuator control unit 102 according to the first exemplary embodiment, the actuator control unit 304 controls an actuator unit 31. If the suction position determining unit 303 determines that an area that can be suctioned is not present, then based on the suction position for taking measures against a wrinkle, the actuator control unit 304 controls the actuator unit 31. Further, the actuator control unit 304 cooperates with a suction control unit 305 to perform control to remove a wrinkle.
<Processing>

Figure 11:
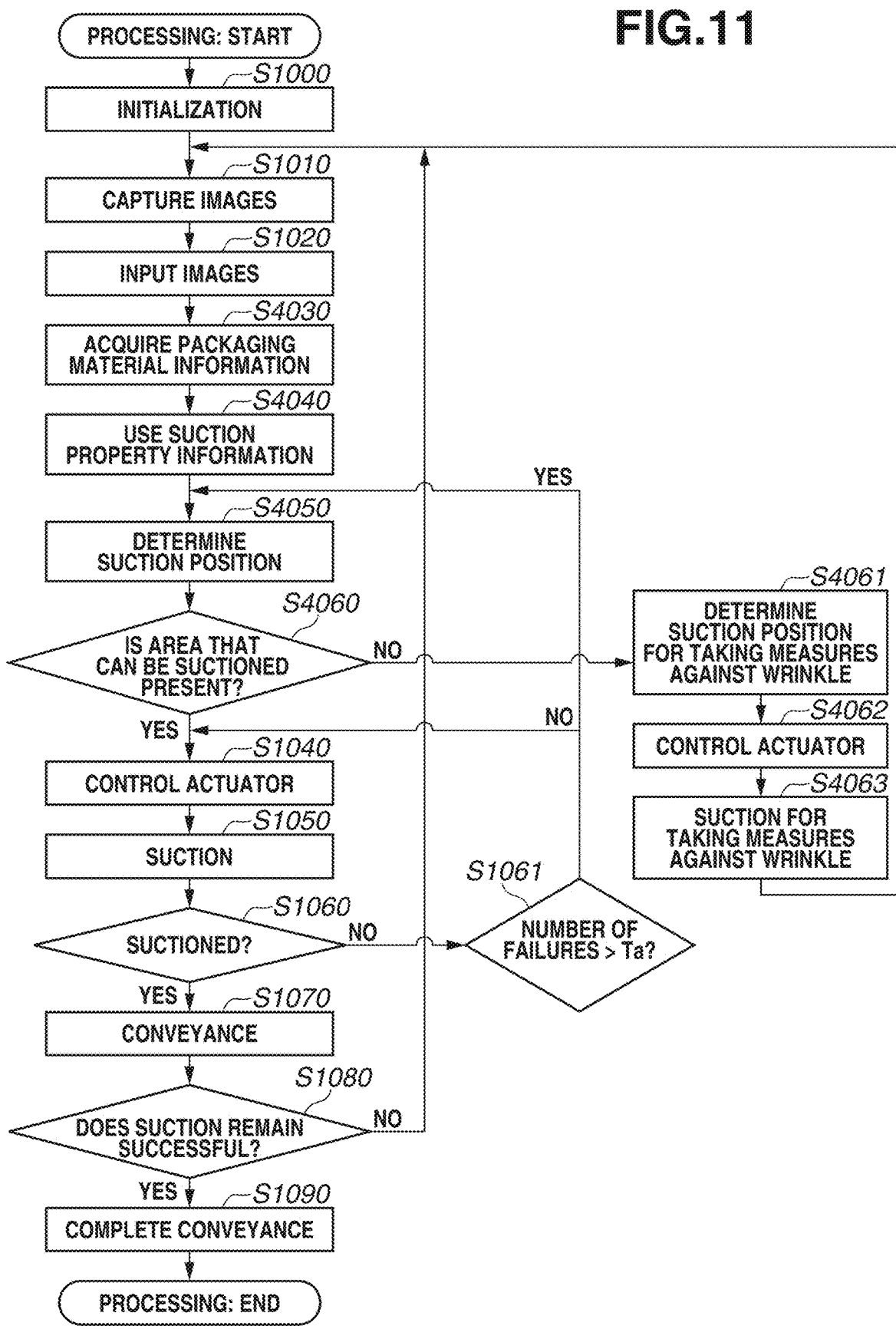
FIG. 11 is a flowchart illustrating a processing procedure performed by the information processing system.

Next, a processing procedure in the present exemplary embodiment is described. FIG. 11 is a flowchart illustrating a processing procedure performed by the information processing system according to the present exemplary embodiment. The flowchart in the present exemplary embodiment is almost similar to the flowchart in FIG. 4 in the first exemplary embodiment. Processes similar to the flowchart in FIG. 4 are not described. Processes different from the flowchart in FIG. 4, namely steps S4030, S4040, S4050, S4060, S4061, S4062, and S4063, are described.

In step S4030, based on the color image and the distance image, the packaging material information acquisition unit 301 acquires packaging material information. The packaging material information acquisition unit 301 acquires the packaging material information in each area of either image, thereby obtaining a packaging material map.

In step S4040, the suction property information holding unit 302 uses suction property information, which is a correspondence table indicating the correspondence between the packaging material information and a numerical value indicating the degree of ease of suction (the likelihood of suction), with respect to the packaging material map obtained in step S4030. Then, the suction property information holding unit 302 converts each area of the packaging material map into the likelihood of suction, thereby generating a suction likelihood map.

In step S4050, based on the suction likelihood map obtained in step S4040 and the color image or the distance image, the suction position determining unit 303 determines an suction position. Further, in the distance image, the suction position determining unit 303 identifies the positions of, among the piled packaged objects 13, packaged objects 13 that are located on the near side and do not interfere with another packaged object 13, and obtains the orientations of the packaged objects 13 three-dimensionally from the distance image. Further, the suction position determining unit 303 obtains a suction candidate area by, based on the orientations of the packaged objects 13, limiting the packaged objects 13 to a packaged object 13 in which a surface that can be suctioned is present. Then, in the suction likelihood map, the suction position determining unit 303 performs a mask process on the suction candidate area, thereby generating a suction target map. That is, using as a mask a two-dimensional image in which the obtained suction candidate area is 1 and other areas are 0, the suction position determining unit 303 takes the product of a pixel of the mask and a pixel of the suction likelihood map, thereby generating the suction target map. Further, with reference to a failure list, the suction position determining unit 303 reduces the numerical value of an area that is difficult to suction on the suction target map, thereby updating the suction target map with the area as an area that is difficult to suction. Then, the suction position determining unit 303 outputs, to the actuator control unit 304, a position having the highest likelihood of suction in the suction target map as a suction position.

In step S4060, based on the suction target map, the suction position determining unit 303 determines whether an area that can be suctioned is present or absent. If an area that can be suctioned is present (YES in step S4060), the suction position determining unit 303 outputs the suction position obtained in step S4050 to the actuator control unit 304, and the processing proceeds to step S4070. If an area that can be suctioned is not present (NO in step S4060), the processing proceeds to step S4061.

In step S4061, based on the suction likelihood map, the suction position determining unit 303 determines an suction position for taking measures against a wrinkle. Specifically, first, using the packaging material map, the suction position determining unit 303 detects, in the suction candidate area, an area having a low likelihood of suction due to a wrinkle on the packaging material. Next, around and near the detected area, the suction position determining unit 303 searches for an area having a high likelihood of suction in the suction likelihood map. If such an area is found, the suction position determining unit 303 sets the found area as the suction position for taking measures against a wrinkle. That is, the suction position for taking measures against a wrinkle is a position inappropriate as a suction candidate for conveyance, but suitable for suction. Further, the suction position for taking measures against a wrinkle is a suction position, near which an area that cannot be suctioned due to the presence of a wrinkle but is the suction candidate area is present. The suction position determining unit 303 outputs the suction position for taking measures against a wrinkle to the actuator control unit 304, and the processing proceeds to step S4062.

In step S4062, the actuator control unit 304 controls the actuator unit 31 so that the suction position for taking measures against a wrinkle can be suctioned. The processing proceeds to step S4063.

In step S4063, the actuator control unit 304 and the suction control unit 305 cooperate to perform suction for taking measures against a wrinkle. The details of an operation method for removing a wrinkle will be described below.

If the wrinkle is removed, the processing returns to step S4010. In step S4010, images are captured again, and the processing continues.

Figure 12A:
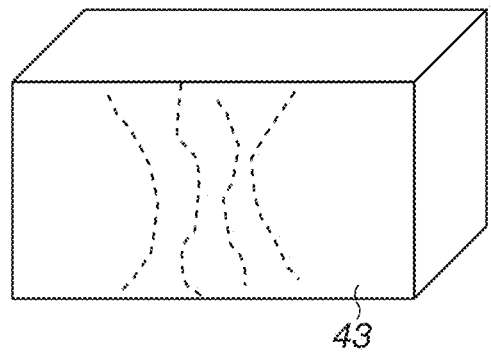
FIGS. 12A, 12B, 12C, and 12D are diagrams illustrating an example of suction for taking measures against a wrinkle.
Figure 12B:
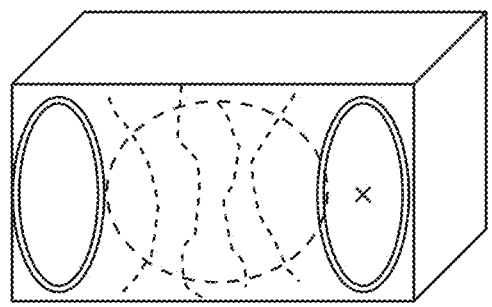
Figure 12C:
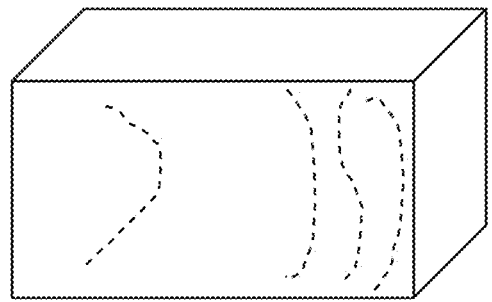
Figure 12D:
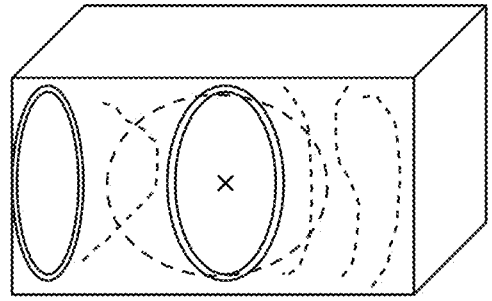

With reference to FIGS. 12A to 12D, the operation of removing a wrinkle is described. FIGS. 12A to 12D are diagrams illustrating an example of suction for taking measures against a wrinkle. FIG. 12A illustrates a packaged object 43 and indicates the occurrence of wrinkles in the center of the packaged object 43 by dotted lines. In FIG. 12B, based on FIG. 12A, areas having a high likelihood in a suction likelihood map are indicated by double lines, a suction candidate area is indicated by a dashed line, and a suction position for taking measures against a wrinkle is indicated by x. In a case where an area that has a high likelihood in the suction likelihood map and is the suction candidate area is not present as described above, suction for taking measures against a wrinkle is necessary. The suction position for taking measures against a wrinkle is selected from areas that are near the suction candidate area and have a high likelihood in the suction likelihood map. Thus, the suction position for taking measures against a wrinkle is the position indicated by x in FIG. 12B. The actuator unit 31 is controlled to perform suction at the position indicated by x in FIG. 12B, and the actuator unit 31 makes the motion of smoothing out the wrinkles in up, down, left, and right directions. FIG. 12C is an example where the wrinkles are smoothed out by stretching the packaging material to the right. FIG. 12D is a diagram where, based on FIG. 12C, areas having a high likelihood in a suction likelihood map are indicated by double lines, a suction candidate area is indicated by a dashed line, and a suction position for taking measures against a wrinkle is indicated by x. In FIG. 12D, an area that has a high likelihood in the suction likelihood map and is the suction candidate area is present. Thus, the position indicated by x can be obtained as a suction position for conveyance. A wrinkle in a suction candidate area is thus removed, whereby it is possible to generate an area that can be suctioned in a suction target map.

By the above processing, even in a case where an area that can be suctioned for conveyance is not present due to the influence of a wrinkle, the information processing system performs suction at an suction position for taking measures against a wrinkle. By making a slight motion in up, down, left, and right directions, the information processing system can smooth out the wrinkle, thereby creating a suction position for conveyance. Then, the information processing system can perform a pick-and-place task.

<Variations>

In steps S4061, S4062, and S4063 in the third exemplary embodiment, an example has been described where in an area that cannot be suctioned due to a wrinkle, the wrinkle is smoothed out, thereby resolving the cause of the wrinkle. However, the method for resolving the cause of the wrinkle is not limited to this. For example, the suction unit 32 or the actuator unit 31 may be pressed against the wrinkle area, or the motion of stroking the wrinkle area with the suction unit 32 or the actuator unit 31 may be made to level the surface of the packaging material, thereby removing the wrinkle. Alternatively, the suction control unit 305 may perform not suction but discharge to discharge air from the suction unit 32. Then, the suction control unit 305 may smooth the surface of the packaging material by wind pressure, thereby removing the wrinkle.

The present disclosure can be achieved also by performing the following process. This is the process of supplying software (a program) for achieving the functions of the above exemplary embodiments to a system or an apparatus via a network for data communication or various recording media, and of causing a computer (or a CPU or a microprocessor unit (MPU)) of the system or the apparatus to read and execute the program. Further, the program recorded in a computer-readable recording medium may be provided.

According to the present disclosure, it is possible to stably suction a packaged object obtained by packaging an object in a packaging material.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-072601, filed Apr. 4, 2018, which is hereby incorporated by reference herein in its entirety.

What is claimed is:

1. An information processing apparatus comprising:
one or more processors, wherein the one or more processors function as:
an input unit configured to input an image obtained by capturing a packaged object with a packaging material to be suctioned by a suction device for picking up the packaged object; and
a determining unit configured to determine, using a learned model in which the image is input and which outputs information related to a success or a failure of suction on the packaged object included in the image, an area to be suctioned by the suction device with priority given to an area where a surface of the packaging material, identified based on the image, is unlikely to have a wrinkle or a hole.

2. The information processing apparatus according to claim 1, wherein based on the information related to a success or a failure of suction with respect to a state of the area of the surface of the packaging material, the determining unit determines the area to be suctioned by the suction device.

3. The information processing apparatus according to claim 2, wherein the state of the area of the surface is a state where a wrinkle or a hole is present.

4. The information processing apparatus according to claim 1, wherein the determining unit uses the learned model in which a state of the surface of the packaging material included in the image is input and which thereby outputs the information related to a success or a failure of suction on the packaged object included in the image.

5. The information processing apparatus according to claim 1, further comprising an extraction unit configured to extract a position of the packaged object by collating an image feature of the packaged object with the image,
wherein based on the position of the packaged object extracted by the extraction unit, the determining unit further determines a position to be suctioned.

6. The information processing apparatus according to claim 5, wherein the determining unit determines the position to be suctioned in an area where the packaged object is present that is extracted by the extraction unit.

7. The information processing apparatus according to claim 5,
wherein the input unit inputs three-dimensional information regarding the packaged object that is piled,
wherein using the three-dimensional information, the extraction unit further extracts three-dimensional positions of a plurality of the packaged objects, and
wherein based on a three-dimensional position of the packaged object, the determining unit further determines a position of a packaged object to be suctioned among the plurality of the packaged objects.

8. The information processing apparatus according to claim 7, wherein based on the three-dimensional position of the packaged object, the determining unit determines, as a suction target, a packaged object having the smallest distance from an imaging apparatus capturing the image.

9. The information processing apparatus according to claim 1, further comprising a learning unit configured to output, from the image, the information related to a success or a failure of suction with respect to a state of the surface of the packaged object.

10. The information processing apparatus according to claim 9, wherein the learning unit makes a request to preferentially suction an area having a feature of the packaging material for which data regarding the information related to a success or a failure of suction is scarce.

11. The information processing apparatus according to claim 1, further comprising a switching unit configured to, in a case where a plurality of suction devices for suctioning the packaged object is present, switch the suction devices based on sizes of the suction devices.

12. The information processing apparatus according to claim 1, further comprising a control unit configured to control a movement of the suction device for suctioning the packaged object.

13. The information processing apparatus according to claim 12, wherein in a case where an area of a wrinkle is detected near a center of gravity of the packaged object in a state of the surface of the packaged object identified based on the image by the determining unit, the control unit controls the suction device to, after smoothing out the wrinkle by stretching the packaging material, suction the packaged object.

14. The information processing apparatus according to claim 9, further comprising a determination unit configured to determine whether suction performed on the packaged object by the suction device is successful or failed,
wherein based on whether the suction on the packaged object is successful or failed and a position to be suctioned determined by the determining unit, the learning unit learns the information related to a success or a failure of suction.

15. The information processing apparatus according to claim 14, wherein in a case where the determination unit determines that the suction on the packaged object is failed, the determining unit determines a next suction position among a plurality of candidates for positions to be suctioned.

16. A non-transitory computer-readable storage medium that stores a program for causing a computer to execute an information processing method the information processing method comprising:
inputting an image obtained by capturing a packaged object with a packaging material to be suctioned by a suction device for picking up the packaged object; and
determining, using a learned model in which the image is input and which outputs information related to a success or a failure of suction on the packaged object included in the image, an area to be suctioned by the suction device with priority given to an area where a surface of the packaging material, identified based on the image, is unlikely to have a wrinkle or a hole.

17. An information processing method comprising:
inputting an image obtained by capturing a packaged object with a packaging material to be suctioned by a suction device for picking up the packaged object; and
determining, using a learned model in which the image is input and which outputs information related to a success or a failure of suction on the packaged object included in the image, an area to be suctioned by the suction device with priority given to an area where a surface of the packaging material, identified based on the image, is unlikely to have a wrinkle or a hole.

18. An information processing apparatus comprising:
one or more processors, wherein the one or more processors function as:
an input unit configured to input an image obtained by capturing a packaged object with a packaging material to be suctioned by a suction device for picking up the packaged object; and
a determining unit configured to determine, using a learned model in which the image is input and which outputs a state of the surface of the packaging material included in the image, an area to be suctioned by the suction device with priority given to an area where a surface of the packaging material, identified based on the image, is unlikely to have a wrinkle or a hole.

* * * * *